United States Patent
Hawes et al.

(10) Patent No.: US 11,304,448 B2
(45) Date of Patent: Apr. 19, 2022

(54) VAPORIZER ASSEMBLY

(71) Applicant: Altria Client Services LLC, Richmond, VA (US)

(72) Inventors: Eric Hawes, Glen Allen, VA (US); Raymond W. Lau, Richmond, VA (US); Mik Dahl, Lapu-Lapu (PH); Jon Jarantilla, Lapu-Lapu (PH); Galen Salvador, Lapu-Lapu (PH); Jose Jesus Paolo Montalvan, Mandaue (PH); Jeroen Kok, Amsterdam (NL)

(73) Assignee: Altria Client Services LLC, Richmond, VA (US)

( * ) Notice: Subject to any disclaimer, the term of this patent is extended or adjusted under 35 U.S.C. 154(b) by 145 days.

(21) Appl. No.: 16/196,749

(22) Filed: Nov. 20, 2018

(65) Prior Publication Data

US 2020/0154783 A1 May 21, 2020

(51) Int. Cl.
- *A24F 40/44* (2020.01)
- *A24F 40/40* (2020.01)
- *A24F 40/10* (2020.01)

(52) U.S. Cl.
CPC ............ *A24F 40/40* (2020.01); *A24F 40/44* (2020.01); *A24F 40/10* (2020.01)

(58) Field of Classification Search
CPC ........ A24F 47/008; A24F 40/44; A24F 40/48; A24F 40/10; A24F 40/46; A24F 47/00
See application file for complete search history.

(56) References Cited

U.S. PATENT DOCUMENTS 9,247,773 B2    2/2016  Memari et al.
9,254,007 B2    2/2016  Liu
(Continued)

FOREIGN PATENT DOCUMENTS

CN    203538369       4/2014
CN    203748684 U     8/2014
(Continued)

OTHER PUBLICATIONS

International Search Report and Written Opinion thereof dated Feb. 14, 2020 for corresponding International Application No. PCT/EP2019/081970.
International Search Report and Written Opinion thereof dated Feb. 24, 2020 for corresponding International Application No. PCT/EP2019/081972.
International Search Report and Written Opinion thereof dated Feb. 19, 2020 for corresponding International Application No. PCT/EP2019/081987.

(Continued)

Primary Examiner — Michael J Felton
(74) Attorney, Agent, or Firm — Harness, Dickey & Pierce, P.L.C.

(57) ABSTRACT

A vaporizer assembly, which includes a heating element and a conduit assembly configured to direct air to flow through a conduit in fluid communication with the heating element, further includes a dispensing interface assembly configured to be in fluid communication with both the conduit and the vaporizer assembly exterior. The dispensing interface assembly includes a first dispensing interface and a second dispensing interface. The first dispensing interface is in direct fluid communication with the conduit and the heating element. A portion of the second dispensing interface is exposed to the vaporizer assembly exterior. The second dispensing interface is isolated from direct fluid communication with the heating element by the first dispensing interface, and the first dispensing interface is isolated from direct fluid communication with the reservoir by the second dispensing interface. The second dispensing interface is configured to restrict a flow of pre-vapor formulation to the first dispensing interface.

20 Claims, 11 Drawing Sheets

(56) References Cited

U.S. PATENT DOCUMENTS

| | | | |
|---|---|---|---|
| 9,308,336 B2 | 4/2016 | Newton | |
| 9,750,282 B2 | 9/2017 | Liu | |
| 9,795,169 B1 | 10/2017 | Zhu | |
| 9,814,264 B2 | 11/2017 | Coelho Belo Fernandes De Carvalho | |
| 9,907,341 B1 | 3/2018 | Zhu | |
| 9,961,942 B2 | 5/2018 | Liu | |
| 9,993,025 B2 | 6/2018 | Alarcon et al. | |
| 2014/0290674 A1 | 10/2014 | Liu | |
| 2015/0128971 A1 | 5/2015 | Verleur et al. | |
| 2015/0196055 A1 | 7/2015 | Liu | |
| 2015/0335071 A1 | 11/2015 | Brinkley et al. | |
| 2016/0007654 A1 | 1/2016 | Zhu | |
| 2016/0073692 A1 | 3/2016 | Alarcon et al. | |
| 2016/0095357 A1 | 4/2016 | Burton | |
| 2016/0120226 A1 | 5/2016 | Rado | |
| 2016/0120227 A1 | 5/2016 | Levitz et al. | |
| 2016/0157522 A1 | 6/2016 | Zhu | |
| 2016/0219938 A1 | 8/2016 | Mamoun et al. | |
| 2016/0262452 A1 | 9/2016 | Zhu | |
| 2016/0286860 A1 | 10/2016 | Flayler | |
| 2017/0001854 A1 | 1/2017 | Li et al. | |
| 2017/0013880 A1 | 1/2017 | O'Brien et al. | |
| 2017/0027227 A1* | 2/2017 | Lipowicz | H05B 3/40 |
| 2017/0065001 A1 | 3/2017 | Li et al. | |
| 2017/0071251 A1 | 3/2017 | Goch | |
| 2017/0105451 A1 | 4/2017 | Fornarelli | |
| 2017/0113007 A1 | 4/2017 | Wu | |
| 2017/0156408 A1 | 6/2017 | Li et al. | |
| 2017/0188636 A1 | 7/2017 | Li et al. | |
| 2017/0208869 A1 | 7/2017 | Li et al. | |
| 2017/0238614 A1 | 8/2017 | Li et al. | |
| 2017/0280778 A1* | 10/2017 | Force | A24F 47/008 |
| 2017/0290370 A1 | 10/2017 | Garthaffner et al. | |
| 2017/0354180 A1 | 12/2017 | Fornarelli | |
| 2018/0007961 A1 | 1/2018 | Zhu | |
| 2018/0007966 A1 | 1/2018 | Li et al. | |
| 2018/0020726 A1 | 1/2018 | Alarcon et al. | |
| 2018/0035718 A1 | 2/2018 | Liu | |
| 2018/0077967 A1 | 3/2018 | Hatton et al. | |
| 2018/0077968 A1 | 3/2018 | Qiu | |
| 2018/0098573 A1 | 4/2018 | Yu et al. | |
| 2018/0098575 A1 | 4/2018 | Liu | |
| 2018/0110940 A1 | 4/2018 | Suzuki et al. | |
| 2018/0168236 A1 | 6/2018 | Qiu | |
| 2018/0199631 A1 | 7/2018 | Chen et al. | |
| 2018/0279691 A1 | 10/2018 | Li et al. | |
| 2018/0280636 A1 | 10/2018 | Jiang et al. | |

FOREIGN PATENT DOCUMENTS

| | | |
|---|---|---|
| CN | 104082863 A | 10/2014 |
| CN | 203851819 U | 10/2014 |
| CN | 203860454 | 10/2014 |
| CN | 203860455 | 10/2014 |
| CN | 203986123 | 12/2014 |
| CN | 204048044 U | 12/2014 |
| CN | 204104840 U | 1/2015 |
| CN | 104544568 A | 4/2015 |
| CN | 204861175 U | 12/2015 |
| CN | 105310112 A | 2/2016 |
| CN | 205390305 U | 7/2016 |
| CN | 105815810 A | 8/2016 |
| CN | 105942581 A | 9/2016 |
| CN | 205695706 | 11/2016 |
| CN | 205865989 | 1/2017 |
| CN | 106418714 A | 2/2017 |
| CN | 107095346 A | 8/2017 |
| CN | 206380711 | 8/2017 |
| CN | 206413751 | 8/2017 |
| CN | 206453250 | 9/2017 |
| CN | 206534130 | 10/2017 |
| CN | 107373758 A | 11/2017 |
| CN | 107411173 A | 12/2017 |
| CN | 107411176 A | 12/2017 |
| CN | 206866629 | 1/2018 |
| CN | 206978739 | 2/2018 |
| CN | 206978745 | 2/2018 |
| CN | 207040881 | 2/2018 |
| CN | 207100510 | 3/2018 |
| CN | 207167762 | 4/2018 |
| CN | 207185918 | 4/2018 |
| CN | 207252783 | 4/2018 |
| CN | 107981418 A | 5/2018 |
| CN | 207306063 | 5/2018 |
| CN | 207306075 | 5/2018 |
| CN | 207306079 | 5/2018 |
| DE | 202014001717 U1 | 5/2015 |
| EP | 286892 A1 | 4/2015 |
| EP | 3031339 A1 | 6/2016 |
| EP | 3254571 A1 | 12/2017 |
| EP | 3275322 A1 | 1/2018 |
| EP | 3305110 A2 | 4/2018 |
| EP | 3338571 A2 | 6/2018 |
| WO | WO-2014/187770 A2 | 11/2014 |
| WO | WO-2014201432 A1 | 12/2014 |
| WO | WO-2015/062136 A1 | 5/2015 |
| WO | WO-2015/117704 A1 | 8/2015 |
| WO | WO-2016/008217 A1 | 1/2016 |
| WO | WO-2016045058 A1 | 3/2016 |
| WO | WO-2016/096780 A1 | 6/2016 |
| WO | WO-2016090426 A1 | 6/2016 |
| WO | WO-2016/119098 A1 | 8/2016 |
| WO | WO-2016/141508 A1 | 9/2016 |
| WO | WO-2016/145612 A1 | 9/2016 |
| WO | WO-2016/145613 A1 | 9/2016 |
| WO | WO-2016/154994 A1 | 10/2016 |
| WO | WO-2016/155103 A1 | 10/2016 |
| WO | WO-2016201602 A1 | 12/2016 |
| WO | WO-2017033132 A1 | 3/2017 |
| WO | 2017063535 A1 | 4/2017 |
| WO | WO-2017113513 A1 | 7/2017 |
| WO | WO-2017118135 A1 | 7/2017 |
| WO | WO-2017124334 A1 | 7/2017 |
| WO | WO-2017156733 A1 | 9/2017 |
| WO | WO-2017190602 A1 | 11/2017 |

OTHER PUBLICATIONS

Written Opinion dated Oct. 22, 2020 for corresponding International Application No. PCT/EP2019/081985.

U.S. Office Action dated Oct. 28, 2020 for corresponding U.S. Appl. No. 16/196,344.

Anonymous: "iJust 2 Airflow Control Ring." Retrieved from the Internet on Nov. 16, 2018. URL: https://www.eleafus.com/ijust-2-airflow-control-ring.html.

Anonymous: "Newest Hurricane RTA Atomizer Adjustable Airflow E-Phoenix Hurricane RBA Tank VS Fire Bird Goblin Mini Kayfun V3 Mini Vaporizers DHL." Retrieved from the Internet Nov. 16, 2018. URL: https://www.dhgate.com/product/newest-hurricane-rta-atomizer-adjustable/377737091.html.

Anonymous: "China eCig Supplier Elego Wholesale Huge Vapor Starter Kit 2200mah Yocan X-linx." Retrieved from the Internet Nov. 16, 2018. URL: https://www.alibaba.com/product-detail/China-eCig-Supplier-Elego-Wholesale-Huge_60332730872.html?spm=a2700.7724857.normalList.5.785a140b%E2%80%A6.

Anonymous: "ShenRay TAE Adjustable Airflow Atomizer 5ml Capacity Vaporizer 25mm RTA Electronic Cigarette rta Vape." Retrieved from the Internet Nov. 16, 2018. URL: https://www.aliexpress.com/item/ShenRay-TAE-Adjustable-Airflow-Atomizer-5ml-Capacity-Vaporizer-25mm-RTA-Electronic-Cigarette-rta-Vape/328461%E2%80%A6.

Anonymous: "OBS T-VCT Sub Ohm Tank E-Cigarette 6ml RBA Atomizer with 0.25o." Retrieved from the internet Nov. 16, 2018. URL: https://www.gearbest.com/electronic-cigarettes/pp_187373.html.

Anonymous: "SER Little 16mm RDA Atomizer—SILVER." Retrieved from the internet Nov. 16, 2018. URL: https://www.gearbest.com/vapor-styles/pp_618116.html.

(56) References Cited

OTHER PUBLICATIONS

Anonymous: "Authentic Aspire Mini Nautilus E-Cigarette Atomizer Kit—SILVER." Retrieved from the Internet Nov. 16, 2018. URL: https://www.gearbest.com/electronic-cigarettes/pp_104356.html.
International Search Report and Written Opinion thereof dated Feb. 19, 2020 for corresponding International Application No. PCT/EP2019/081985.
U.S. Office Action dated Nov. 5, 2020 for corresponding U.S. Appl. No. 16/196,219.
Written Opinion dated Nov. 3, 2020 for corresponding International Application No. PCT/EP2019/081970.
U.S. Office Action dated Mar. 31, 2021 for corresponding U.S. Appl. No. 16/196,344.
U.S. Notice of Allowance dated Apr. 1, 2021 for corresponding U.S. Appl. No. 16/190,219.
International Preliminary Report on Patentability dated Feb. 16, 2021 for corresponding International Application No. PCT/EP2019/081985.
International Preliminary Report on Patentability dated Mar. 5, 2021 for corresponding International Application No. PCT/EP2019/081970.
International Preliminary Report on Patentability dated May 25, 2021 for corresponding International Application No. PCT/EP2019/081987.
U.S. Notice of Allowance dated Dec. 29, 2021 for corresponding U.S. Appl. No. 16/196,866.
U.S. Office Action dated May 10, 2021 for U.S. Appl. No. 16/196,866.
U.S. Notice of Allowance dated Jun. 3, 2021 for corresponding U.S. Appl. No. 16/196,219.
U.S. Office Action dated Nov. 19, 2021 for corresponding U.S. Appl. No. 16/196,344.

* cited by examiner

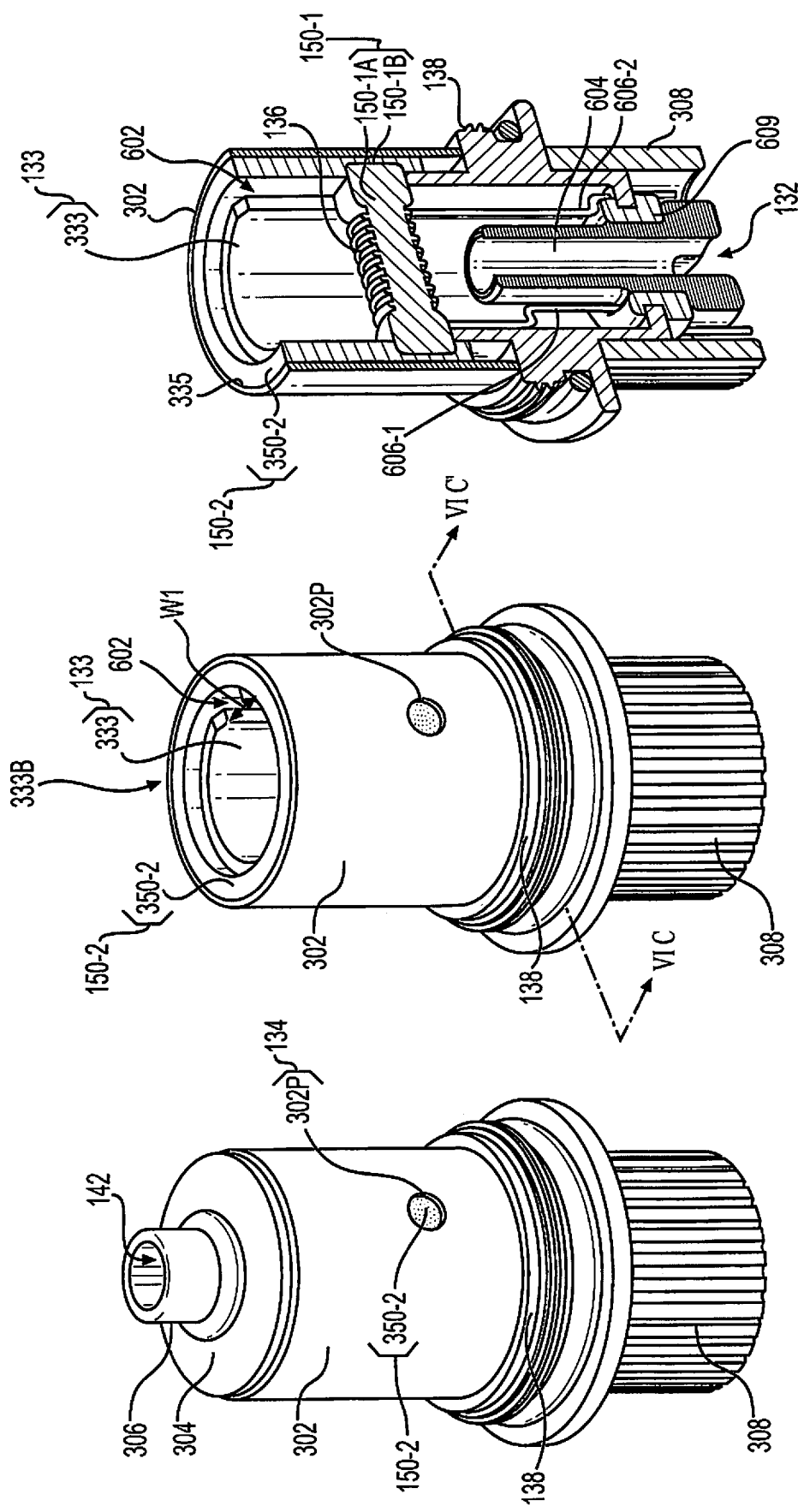

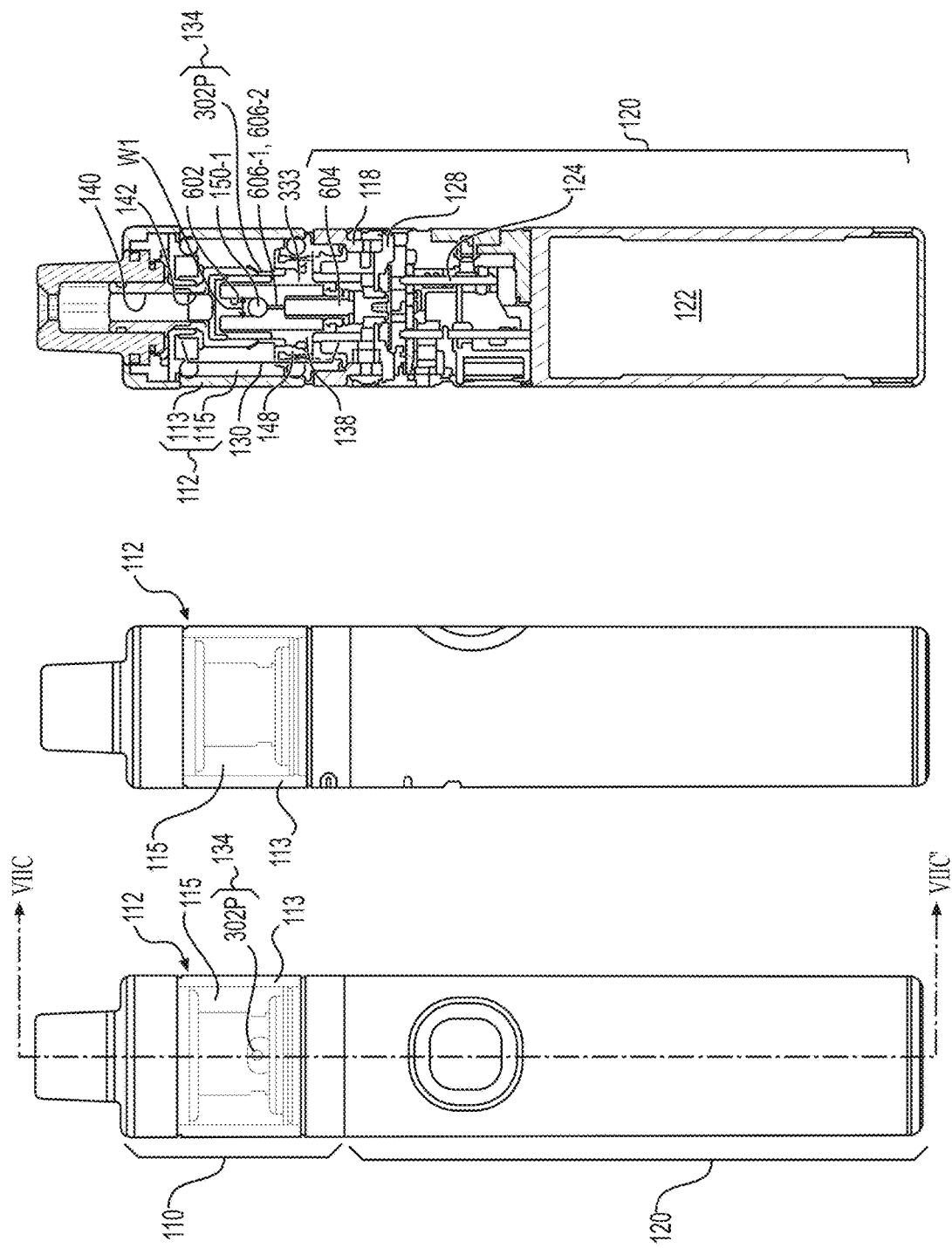

VAPORIZER ASSEMBLY

BACKGROUND

Field

Example embodiments relate to electronic vaping devices, e-vaping devices, or the like.

Description of Related Art

E-vaping devices, also referred to herein as electronic vaping devices (EVDs) may be used by adult vapers for fluid portable vaping. An e-vaping device may include a reservoir that holds pre-vapor formulation and a vaporizer assembly that may heat pre-vapor formulation drawn from the reservoir to generate a vapor.

SUMMARY

According to some example embodiments, a vaporizer assembly for an e-vaping device includes a heating element, a conduit assembly, and a dispensing interface assembly. The conduit assembly may include one or more inner surfaces defining a conduit extending through an interior of the conduit assembly, such that the conduit assembly is configured to direct air to flow through the conduit in fluid communication with the heating element. The dispensing interface assembly may be configured to be in fluid communication with both the conduit and a reservoir holding pre-vapor formulation. The dispensing interface assembly may be configured to supply a limited amount of the pre-vapor formulation from the reservoir to the heating element. The dispensing interface assembly may include a first dispensing interface and a second dispensing interface. The first dispensing interface may extend through the conduit and be coupled to the heating element within the conduit such that the first dispensing interface is in direct fluid communication with the conduit and the heating element. A portion of the second dispensing interface may be exposed to an exterior of the vaporizer assembly such that the second dispensing interface is configured to be in direct fluid communication with the reservoir via the portion of the second dispensing interface. The second dispensing interface may be isolated from direct fluid communication with the heating element by the first dispensing interface. The first dispensing interface may be isolated from direct fluid communication with the reservoir by the second dispensing interface. The second dispensing interface may be configured to restrict a flow of pre-vapor formulation from the reservoir to the first dispensing interface.

The conduit assembly may include a hollow cylindrical inner housing. The first dispensing interface may extend transversely between opposing inner surfaces of the hollow cylindrical inner housing. The second dispensing interface may include a hollow cylindrical dispensing interface structure that extends around an outer surface of the hollow cylindrical inner housing. An inner surface of the hollow cylindrical dispensing interface structure may be direct contact with a surface of the first dispensing interface. An outer surface of the hollow cylindrical dispensing interface structure may be exposed to the exterior of the vaporizer assembly.

The vaporizer assembly may include a cylindrical outer housing including a port extending through the cylindrical outer housing. The hollow cylindrical inner housing, the first dispensing interface, and the second dispensing interface may be enclosed within an interior space defined by the cylindrical outer housing. The hollow cylindrical dispensing interface structure may be in an annular space defined by the outer surface of the hollow cylindrical inner housing and an inner surface of the cylindrical outer housing. The cylindrical outer housing may be configured to expose the annular space to the reservoir through the port, such that the hollow cylindrical dispensing interface structure within the annular space is configured to be in direct fluid communication with the reservoir through the port.

The first dispensing interface may be in direct contact with the heating element.

The second dispensing interface may be in direct contact with the first dispensing interface.

The second dispensing interface may be isolated from direct fluid communication with the conduit.

The vaporizer assembly may be configured to be detachably coupled to the reservoir.

According to some example embodiments, a cartridge for an e-vaping device may include a reservoir configured to hold a pre-vapor formulation and a vaporizer assembly coupled to the reservoir. The vaporizer assembly may be configured to draw pre-vapor formulation from the reservoir. The vaporizer assembly may be configured to heat the drawn pre-vapor formulation to form a generated vapor. The vaporizer assembly may include a heating element, a conduit assembly, and a dispensing interface assembly. The conduit assembly may include one or more inner surfaces defining a conduit extending through an interior of the conduit assembly, such that the conduit assembly is configured to direct air to flow through the conduit in fluid communication with the heating element. The dispensing interface assembly may be configured to be in fluid communication with both the conduit and the reservoir. The dispensing interface assembly may be configured to supply a limited amount of the pre-vapor formulation from the reservoir to the heating element. The dispensing interface assembly may include a first dispensing interface and a second dispensing interface. The first dispensing interface may extend through the conduit and may be coupled to the heating element within the conduit such that the first dispensing interface is in direct fluid communication with the conduit and the heating element. A portion of the second dispensing interface may be exposed to an exterior of the vaporizer assembly such that the second dispensing interface is configured to be in direct fluid communication with the reservoir via the portion of the second dispensing interface. The second dispensing interface may be isolated from direct fluid communication with the heating element by the first dispensing interface. The first dispensing interface may be isolated from direct fluid communication with the reservoir by the second dispensing interface. The second dispensing interface may be configured to restrict a flow of pre-vapor formulation from the reservoir to the first dispensing interface.

The conduit assembly may include a hollow cylindrical inner housing. The first dispensing interface may extend transversely between opposing inner surfaces of the hollow cylindrical inner housing. The second dispensing interface may include a hollow cylindrical dispensing interface structure that extends around an outer surface of the hollow cylindrical inner housing. An inner surface of the hollow cylindrical dispensing interface structure may be direct contact with a surface of the first dispensing interface. An outer surface of the hollow cylindrical dispensing interface structure may be exposed to the exterior of the vaporizer assembly.

The vaporizer assembly may include a cylindrical outer housing including a port extending through the cylindrical outer housing. The hollow cylindrical inner housing, the first dispensing interface, and the second dispensing interface may be enclosed within an interior space defined by the cylindrical outer housing. The hollow cylindrical dispensing interface structure of the second dispensing interface may be in an annular space defined by the outer surface of the hollow cylindrical inner housing and an inner surface of the cylindrical outer housing. The cylindrical outer housing may be configured to expose the annular space to the reservoir through the port, such that the hollow cylindrical dispensing interface structure within the annular space is configured to be in direct fluid communication with the reservoir through the port.

The first dispensing interface may be in direct contact with the heating element.

The second dispensing interface may be in direct contact with the first dispensing interface.

The second dispensing interface may be isolated from direct fluid communication with the conduit.

The vaporizer assembly may be detachably coupled to the reservoir.

According to some example embodiments, an e-vaping device may include a cartridge and a power supply assembly coupled to the cartridge. The cartridge may include a reservoir configured to hold a pre-vapor formulation and a vaporizer assembly coupled to the reservoir. The vaporizer assembly may be configured to draw pre-vapor formulation from the reservoir. The vaporizer assembly may be configured to heat the drawn pre-vapor formulation to form a generated vapor. The vaporizer assembly may include a heating element, a conduit assembly, and a dispensing interface assembly. The conduit assembly may include one or more inner surfaces defining a conduit extending through an interior of the conduit assembly, such that the conduit assembly is configured to direct air to flow through the conduit in fluid communication with the heating element. The dispensing interface assembly may be configured to be in fluid communication with both the conduit and the reservoir. The dispensing interface assembly may be configured to supply a limited amount of the pre-vapor formulation from the reservoir to the heating element. The dispensing interface assembly may include a first dispensing interface and a second dispensing interface. The first dispensing interface may extend through the conduit and may be coupled to the heating element within the conduit such that the first dispensing interface is in direct fluid communication with the conduit and the heating element. A portion of the second dispensing interface may be exposed to an exterior of the vaporizer assembly such that the second dispensing interface is configured to be in direct fluid communication with the reservoir via the portion of the second dispensing interface. The second dispensing interface may be isolated from direct fluid communication with the heating element by the first dispensing interface. The first dispensing interface may be isolated from direct fluid communication with the reservoir by the second dispensing interface. The second dispensing interface may be configured to restrict a flow of pre-vapor formulation from the reservoir to the first dispensing interface. The power supply assembly may include a power supply. The power supply assembly may be configured to supply electrical power from the power supply to the vaporizer assembly.

The conduit assembly may include a hollow cylindrical inner housing. The first dispensing interface may extend transversely between opposing inner surfaces of the hollow cylindrical inner housing. The second dispensing interface may include a hollow cylindrical dispensing interface structure that extends around an outer surface of the hollow cylindrical inner housing. An inner surface of the hollow cylindrical dispensing interface structure may be direct contact with a surface of the first dispensing interface. An outer surface of the hollow cylindrical dispensing interface structure may be exposed to the exterior of the vaporizer assembly.

The vaporizer assembly may include a cylindrical outer housing including a port extending through the cylindrical outer housing. The hollow cylindrical inner housing, the first dispensing interface, and the second dispensing interface may be enclosed within an interior space defined by the cylindrical outer housing. The hollow cylindrical dispensing interface structure of the second dispensing interface may be in an annular space defined by the outer surface of the hollow cylindrical inner housing and an inner surface of the cylindrical outer housing. The cylindrical outer housing may be configured to expose the annular space to the reservoir through the port, such that the hollow cylindrical dispensing interface structure within the annular space is configured to be in direct fluid communication with the reservoir through the port.

The first dispensing interface may be in direct contact with the heating element.

The second dispensing interface may be in direct contact with the first dispensing interface.

The second dispensing interface may be isolated from direct fluid communication with the conduit.

The vaporizer assembly may be detachably coupled to the reservoir.

The cartridge may be detachably coupled to the power supply assembly.

The vaporizer assembly may be detachably coupled to the reservoir.

The power supply may be a rechargeable battery.

BRIEF DESCRIPTION OF THE DRAWINGS

The various features and advantages of the non-limiting example embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 6A is a perspective view of a vaporizer assembly according to some example embodiments.

FIG. 6B is a perspective view of the vaporizer assembly of FIG. 6A according to some example embodiments.

FIG. 6C is a cross-sectional view along line VIC-VIC' of the vaporizer assembly of FIG. 6A according to some example embodiments.

FIG. 7A is a side view of an e-vaping device according to some example embodiments.

FIG. 7B is a side view of the e-vaping device of FIG. 7A according to some example embodiments.

FIG. 7C is a cross-sectional view along line VIIC-VIIC' of the e-vaping device of FIG. 7A according to some example embodiments.

DETAILED DESCRIPTION OF EXAMPLE EMBODIMENTS

Figures 1A, 1B:
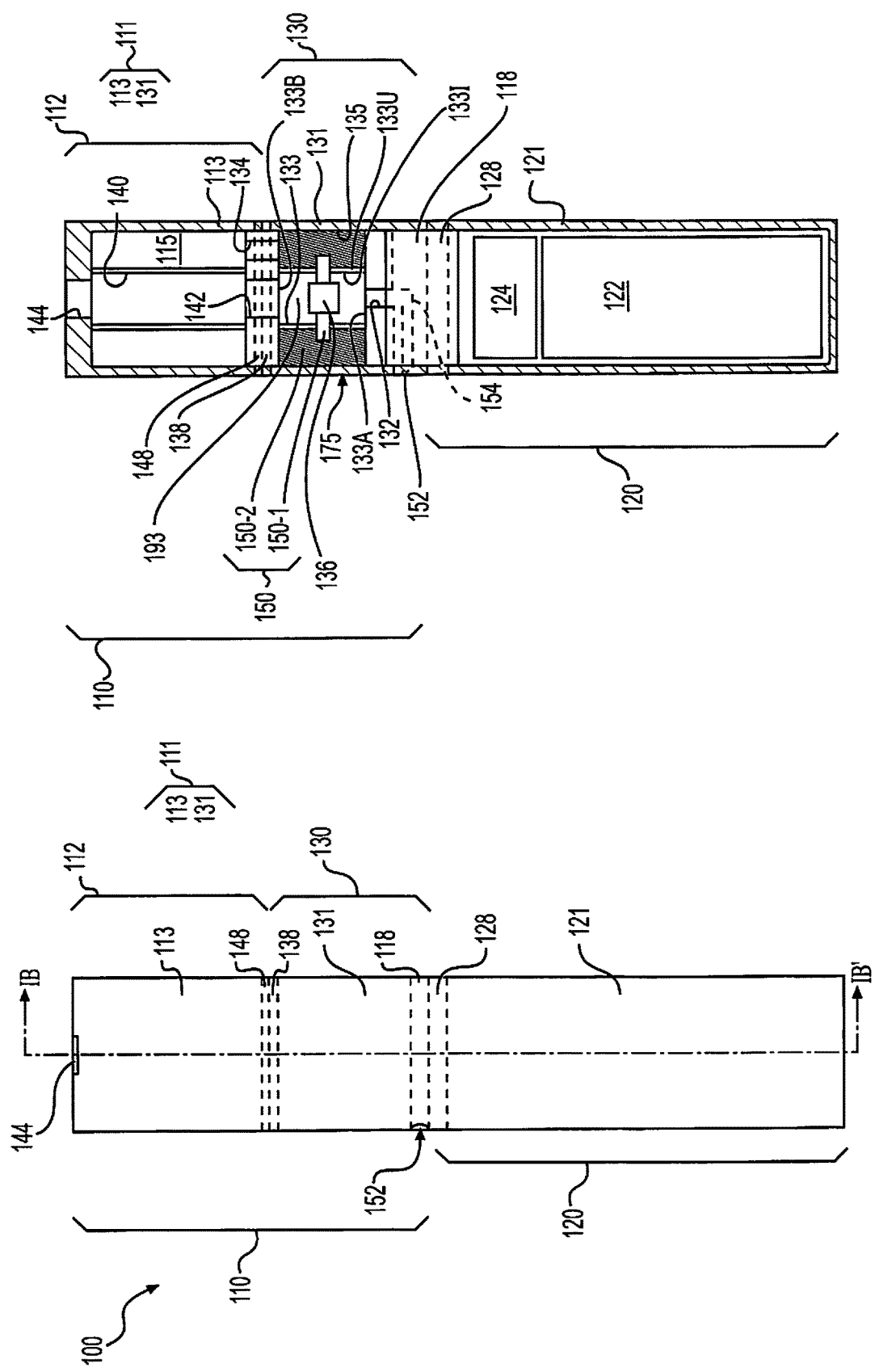
FIG. 1A is a side view of an e-vaping device according to some example embodiments.
FIG. 1B is a cross-sectional view along line IB-IB' of the e-vaping device of FIG. 1A according to some example embodiments.

Some detailed example embodiments are disclosed herein. However, specific structural and functional details disclosed herein are merely provided for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives thereof. Like numbers refer to like elements throughout the description of the figures.

It should be understood that when an element or layer is referred to as being "on," "connected to," "coupled to," "attached to," "adjacent to," or "covering" another element or layer, it may be directly on, connected to, coupled to, attached to, adjacent to or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations or sub-combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, etc., but do not preclude the presence or addition of one or more other features, integers, steps, operations, elements, etc., and/or groups thereof.

When the words "about" and "substantially" are used in this specification in connection with a numerical value, it is intended that the associated numerical value include a tolerance of ±10% around the stated numerical value, unless otherwise explicitly defined.

Example embodiments are described herein with reference to cross-sectional illustrations that are schematic illustrations of example embodiments. As such, variations from the shapes of the illustrations are to be expected. Thus, example embodiments should not be construed as limited to the shapes of regions illustrated herein but are to include deviations in shapes.

Vapor, aerosol and dispersion are used interchangeably and are meant to cover the matter generated or outputted by the devices disclosed, claimed and/or equivalents thereof.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Hardware may be implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

FIG. 1A is a side view of an e-vaping device 100 according to some example embodiments. FIG. 1B is a cross-sectional view along line IB-IB' of the e-vaping device 100 of FIG. 1A according to some example embodiments. As used herein, the term "e-vaping device" is inclusive of all types of electronic vaping devices, regardless of form, size or shape.

Referring to FIGS. 1A-1B, the e-vaping device 100 includes a vapor generator assembly 110 and a power supply assembly 120. In some example embodiments, a vapor generator assembly 110 that is configured to be detachably coupled to a power supply assembly 120 to form an e-vaping device 100 may be referred to herein as a cartridge.

In some example embodiments, the vapor generator assembly 110 and power supply assembly 120 include respective complementary connector assemblies 118, 128 and are configured to be detachably connected to each other based on detachably coupling the connector assemblies 118, 128 together. In some example embodiments, the connector assemblies 118, 128 include threaded connectors. It should be appreciated that a connector assembly 118, 128 may be any type of connector, including, without limitation, a snug-fit, detent, clamp, bayonet, sliding fit, sleeve fit, alignment fit, threaded connector, magnetic, clasp, or any other type of connection, and/or combinations thereof.

As shown in FIGS. 1A-1B, the vapor generator assembly 110 may include an outer housing 111, and the power supply assembly 120 may include an outer housing 121. As further shown in FIGS. 1A-1B, in some example embodiments, the outer housing 111 of the vapor generator assembly 110 and the outer housing 121 of the power supply assembly 120 may include a unitary piece of material.

As shown in FIGS. 1A-1B, the vapor generator assembly 110 may include a reservoir 112 and a vaporizer assembly 130. The outer housing 111 of the vapor generator assembly 110 may include an outer housing 113 of the reservoir 112 and a separate outer housing 131 of the vaporizer assembly 130. In some example embodiments, housings 113 and 131 are separate connectable housings, and in some example embodiments housings 113 and 131 form part of the same housing. As shown in FIGS. 1A-1B, in some example embodiments, the outer housing 113 of the reservoir 112 and the outer housing 131 of the vaporizer assembly 130 may be included in a unitary piece of material. In some example embodiments, where housing 113 meets with housing 131 may form part of the same housing, or these may be two separate housings that can be connected together via complementary connector assemblies 138, 148.

The outer housing 113 of the reservoir 112 may at least partially define an interior space 115. The reservoir 112 may be configured to hold a pre-vapor formulation within the interior of the reservoir 112, where the interior may include the interior space 115 at least partially defined by the outer housing 113 of the reservoir 112.

As shown in at least FIGS. 1A-1B, the vaporizer assembly 130 may include an outer housing 131 that at least partially defines an interior space 135 of the vaporizer assembly 130. As further shown in at least FIGS. 1A-1B, the vaporizer assembly 130 may include a fluid port 134, which extends through the outer housing 131 of the vaporizer assembly 130 between the interior space 135 of the vaporizer assembly 130 and an exterior of the vaporizer assembly 130, such that the fluid port 134 may enable fluid communication between elements at least partially located within the interior space 135 and an exterior of the vaporizer assembly 130. As further shown in FIG. 1B, the fluid port 134 may enable fluid communication between the reservoir 112 and the vaporizer assembly 130. In some example embodiments, the fluid port 134 extends through the outer housing 113 of the reservoir 112, in addition to or instead of extending through the outer housing 131 of the vaporizer assembly 130.

In some example embodiments, the vaporizer assembly 130 and reservoir 112 include respective complementary connector assemblies 138, 148 and are configured to be detachably connected to each other based on detachably coupling the connector assemblies 138, 148 together. For example, the vaporizer connector assembly 148 may be configured to detachably couple the reservoir 112 with the vaporizer assembly 130, for example based on detachably coupling with the connector assembly 138 of the vaporizer assembly 130. In some example embodiments, the connector assemblies 138, 148 include threaded connectors. It should be appreciated that a connector assembly 138, 148 may be any type of connector, including, without limitation, a snug-fit, detent, clamp, bayonet, sliding fit, sleeve fit, alignment fit, threaded connector, magnetic, clasp, or any other type of connection, and/or combinations thereof.

The vaporizer assembly 130 may include conduit assembly 133, an inlet port 132, an outlet port 142, a heating element 136, and a dispensing interface assembly 150. As shown in FIG. 1B, the inlet port 132 may extend through the outer housing 131 of the vaporizer assembly 130 to an exterior of the vaporizer assembly 130, and the outlet port 142 may extend through the outer housing 131 of the vaporizer assembly 130. In some example embodiments, the outlet port 142 may extend through the outer housing 131 to be directly exposed to an exterior of at least the vapor generator assembly 110.

In some example embodiments, including the example embodiments shown in FIGS. 1A-1B, the inlet port 132 may be coupled with inlet port 152 via conduit 154, where the inlet port 152 is directly exposed to the exterior of the vapor generator assembly 110 and the exterior of the e-vaping device 100, such that the inlet port 132 is in fluid communication with the exterior of at least the vapor generator assembly 110 via the inlet port 152 and the conduit 154. In some example embodiments, where the inlet port 132 is directly exposed to the exterior of the vapor generator assembly 110, the inlet port 152 and the conduit 154 may be omitted from the e-vaping device 100. Accordingly, the inlet port 132 enables fluid communication, directly or indirectly, between at least a portion of the interior space 135 of the vaporizer assembly 130 and the exterior of the vapor generator assembly 110.

In some example embodiments, including the example embodiments shown in FIGS. 1A-1B, the outlet port 142 may be coupled with outlet port 144 via conduit 140, where the outlet port 144 is directly exposed to the exterior of the vapor generator assembly 110 and the exterior of the e-vaping device 100, such that the outlet port 142 is in fluid communication with the exterior of at least the vapor generator assembly 110 via the outlet port 144 and the conduit 140. Accordingly, the outlet port 142 enables fluid communication between at least a portion of the interior space 135 of the vaporizer assembly 130 and the exterior of the vapor generator assembly 110.

Still referring to the vaporizer assembly 130, the conduit assembly 133 is a structure that extends between the inlet port 132 and the outlet port 142 of the vaporizer assembly 130 within the interior space 135 that is at least partially defined by the outer housing 131 of the vaporizer assembly 130. As shown, one or more inner surfaces 1331 of the conduit assembly 133 define a hollow space, referred to herein as a conduit 193, that extends continuously through the conduit assembly 133 between the inlet port 132 and the outlet port 142. Accordingly, the conduit assembly 133 establishes fluid communication, via the conduit 193 defined by the inner surface(s) 1331, between the inlet port 132 and the outlet port 142 through the vaporizer assembly 130.

In operation of an e-vaping device 100 according to some example embodiments, air may be drawn into the vaporizer assembly 130 via at least the inlet port 132 and the air may further be drawn through the vaporizer assembly 130 via conduit assembly 133 and further drawn out of the vaporizer assembly 130 and out of the vapor generator assembly 110, and thus out of the e-vaping device 100, via outlet port 142, conduit 140, and outlet port 144. In some example embodiments, and as shown in at least FIG. 1B, conduit assembly 133 may be a cylindrical structure with one or more inner surfaces 1331 that define the conduit 193 between inlet port 132 and outlet port 142 to establish fluid communication between the inlet port 132 and the outlet port 142 through the vaporizer assembly 130.

In the example embodiments shown in FIGS. 1A-1B, the conduit 154 and inlet port 152 may be at least partially located in the connector assembly 118. However, it will be understood that the inlet port 152 may be included in, and may extend through, outer housing 111 of the vapor generator assembly 110 independently of connector assembly 118, outer housing 121 of the power supply assembly 120, connector assembly 128, a sub-combination thereof, or a combination thereof. Additionally, it will be understood that the conduit 154 may extend at least partially through the vapor generator assembly 110, the power supply assembly 120, connector assembly 118, connector assembly 128, a sub-combination thereof, or a combination thereof.

Still referring to the vaporizer assembly 130, the dispensing interface assembly 150 is at least partially exposed to fluid port 134 and thus is configured to be in fluid communication with the reservoir 112 through the fluid port 134. The dispensing interface assembly 150 further extends at least partially into the conduit assembly 133. The dispensing interface assembly 150 may be in fluid communication with the conduit 193 based on the dispensing interface assembly 150 being coupled to the heating element 136. Accordingly, the dispensing interface assembly 150 may be in fluid communication with both the reservoir 112 and the conduit 193 and thus may be configured to draw pre-vapor formulation from the reservoir 112 to the conduit 193.

In some example embodiments, the heating element 136 may be located at least partially within the conduit 193. The heating element 136 may be in fluid communication with the conduit 193, and the conduit assembly 133 may be configured to direct air received via inlet port 132 to flow through the conduit 193 in fluid communication with the heating element 136. As shown in at least FIG. 1B, the heating element 136 is in fluid communication with the dispensing interface assembly 150, such that the heating element 136 is configured to heat at least a portion of the pre-vapor formulation drawn into the conduit 193 via the dispensing interface assembly 150 to form a generated vapor within the conduit 193, such that the generated vapor may be drawn out of the vaporizer assembly 130 and out of the vapor generator assembly 110, and thus out of the e-vaping device 100, through outlet port 142, conduit 140, and outlet port 144. For example, the heating element 136 may be directly coupled to a portion of the dispensing interface assembly 150 that extends at least partially into the conduit 193, or may be in sufficiently close proximity to such a portion of the dispensing interface assembly 150, to be configured to generate sufficient heat to heat the pre-vapor formulation drawn into the portion of the dispensing interface assembly 150 to generate the generated vapor.

Referring back to the dispensing interface assembly 150, the dispensing interface assembly 150 includes a first dispensing interface 150-1 and a second dispensing interface 150-2 that are coupled together and thus are configured to enable transfer of pre-vapor formulation therebetween.

As shown in FIG. 1B, the first dispensing interface 150-1 may extend at least partially through the conduit assembly 133 and may be coupled to the heating element 136 within the conduit assembly 133, such that the first dispensing interface 150-1 is in fluid communication with the conduit 193 and the heating element 136. Additionally, as shown in FIG. 1B, the first dispensing interface 150-1 may extend at least partially out of the conduit assembly 133 while still within the interior space 135 of the vaporizer assembly 130, such that the first dispensing interface 150-1 is in direct fluid communication with the exterior of the conduit assembly 133 within the interior space 135 of the vaporizer assembly 130.

As shown in FIG. 1B, the second dispensing interface 150-2 may be located external to the conduit assembly 133 within the interior space 135 of the vaporizer assembly 130. The second dispensing interface 150-2 may be located within an internal space 175 that is defined by at least the outer housing 131 and one or more outer surfaces 133U of the conduit assembly 133. Accordingly, it will be understood that the internal space 175 may be a limited portion of the interior space 135 that excludes the portion of the interior space 135 that is occupied by the conduit assembly 133 and the conduit 193 defined thereby. As shown, at least a portion of the second dispensing interface 150-2 is exposed to an exterior of the vaporizer assembly 130, for example based on being directly adjacent to and covering an end of the fluid port 134 as shown in FIG. 1B. The second dispensing interface 150-2 may be configured to be in direct fluid communication with the reservoir 112 via the fluid port 134 to which the second dispensing interface 150-2 is directly exposed.

As further shown in FIG. 1B, the second dispensing interface 150-2 may be coupled to the first dispensing interface 150-1 externally to the conduit assembly 133, within internal space 175, while the first dispensing interface 150-1 may be coupled to the heating element 136, such that the second dispensing interface 150-2 may be isolated from direct fluid communication with the conduit 193, the heating element 136, or a combination thereof by the first dispensing interface 150-1. Pre-vapor formulation drawn into the second dispensing interface 150-2 from the reservoir 112 through the fluid port 134 may be further drawn from the second dispensing interface 150-2 to the first dispensing interface 150-1 and may be further drawn into the conduit 193 and into fluid communication with the heating element 136 by the first dispensing interface 150-1, while the second dispensing interface 150-2 remains isolated from directly transferring fluid into sufficient proximity to the heating element 136 to enable the heating element 136 to heat pre-vapor formulation held in the second dispensing interface 150-2 to generate the generated vapor.

Additionally, and as shown in FIG. 1B, the first dispensing interface 150-1 may be isolated from direct fluid communication with the reservoir 112 by the second dispensing interface 150-2, such that the first dispensing interface 150-1 may be isolated from directly drawing pre-vapor formulation from the reservoir 112 independently of the second dispensing interface 150-2.

In some example embodiments, the second dispensing interface 150-2 is configured to restrict a flow of pre-vapor formulation from the reservoir 112 to the first dispensing interface 150-1, relative to embodiments where the first dispensing interface 150-1 is directly exposed to both the conduit and the reservoir 112 and thus may draw pre-vapor formulation directly from the reservoir 112 to fluid communication with the heating element 136. Accordingly, the second dispensing interface 150-2 may be configured to restrict an amount of pre-vapor formulation held in the dispensing interface assembly 150 to not exceed a particular amount and/or may restrict a flow-rate of pre-vapor formulation from the reservoir 112 to the conduit assembly 133.

For example, the first dispensing interface 150-1 may include a wicking material that is configured to be exposed to heat generated by the heating element 136 and may be configured to support a relatively high flow rate of pre-vapor formulation through the internal structure of the first dispensing interface 150-1, while the second dispensing interface 150-2 may be configured to support a relatively low flow rate of pre-vapor formulation through the internal structure of the second dispensing interface 150-2. The first dispensing interface 150-1 may include a wicking material that is configured to be in direct contact with the heating element 136. The second dispensing interface 150-2 may have reduced resilience to heat that would be generated by heating element 136, in relation to the resilience of the first dispensing interface 150-1. In some example embodiments, the second dispensing interface 150-2 may have equal or greater resilience to heat that would be generated by heating element 136, in relation to the resilience of the first dispensing interface 150-1.

In some example embodiments, the first dispensing interface 150-1 may be configured to support a first maximum flow rate of pre-vapor formulation through the internal structure of the first dispensing interface 150-1, and the second dispensing interface 150-2 may be configured to support a second maximum flow rate of pre-vapor formulation through the internal structure of the second dispensing interface 150-2, where the magnitude of the second maximum flow rate is equal to or less than one-half (i.e., 50%) of the magnitude of the first maximum flow rate. The second dispensing interface 150-2 may be configured to "wick" pre-vapor formulation in at least twice the amount of time that the first dispensing interface 150-1 is configured to "wick" pre-vapor formulation. Restated further, the second dispensing interface 150-2 may be associated with a "wicking speed" that is equal to or less than one-half the wicking speed with which the first dispensing interface 150-1 is associated.

In some example embodiments, the second dispensing interface 150-2 is configured to hold an amount of pre-vapor formulation, within the internal structure of the second dispensing interface 150-2, that is sufficient to support at least one full generation of vapor, when the held amount of pre-vapor formulation is further drawn from the second dispensing interface 150-2 to the first dispensing interface 150-1 and is further heated by the heating element 136 to form the vapor. In some example embodiments, the second dispensing interface 150-2 is configured to hold an amount of pre-vapor formulation, within the internal structure of the second dispensing interface 150-2, that is sufficient to support up to three full generations of vapor, when the held amount of pre-vapor formulation is further drawn from the second dispensing interface 150-2 to the first dispensing interface 150-1 and is further heated by the heating element 136 to form the vapor.

In some example embodiments, the vapor generator assembly 110 may be configured to generate at least one additional instance of vapor even after the reservoir 112 is completely depleted of all pre-vapor formulation, because an amount of pre-vapor formulation sufficient to support the generation of at least one additional instance of vapor is still held in the second dispensing interface 150-2 upon the moment of complete depletion of pre-vapor formulation from the reservoir 112. In some example embodiments, where the outer housing 113 is sufficiently transparent to enable external observation of an amount of pre-vapor formulation held in the reservoir 112, the configuration of the second dispensing interface 150-2 to hold pre-vapor formulation even upon depletion of the pre-vapor formulation held in the reservoir 112 may enable the second dispensing interface 150-2 to provide a buffer against complete depletion of pre-vapor formulation from the vapor generator assembly 110 prior to replenishment of the pre-vapor formulation in the reservoir 112, thereby enabling depletion of the pre-vapor formulation from the reservoir 112 to be observed through the outer housing 113, and the reservoir 112 to be replenished with additional pre-vapor formulation, while the dispensing interface 150-2 is able to support generation of at least one additional instance of vapor in the event that the complete depletion of the reservoir 112 is initially unnoticed, and at least one instance of vapor is generated, subsequent to depletion of the reservoir 112. Thus, it will be understood that the second dispensing interface 150-2 may provide a buffer against complete depletion of pre-vapor formulation at the first dispensing interface 150-1, thereby protecting against overheating of the dispensing interface assembly 150 due to heating of a depleted first dispensing interface 150-1 by the heating element 136 and thus improving performance of an e-vaping device 100 that includes the dispensing interface assembly 150.

Based on the second dispensing interface 150-2 restricting the flow of pre-vapor formulation from the reservoir 112 to the conduit 193, the dispensing interface assembly 150 that includes both the first and second dispensing interfaces 150-1, 150-2 may be configured to control the flow of pre-vapor formulation from the reservoir 112 to the conduit 193 and thus ensure that a particular amount of pre-vapor formulation is heated by the heating element 136 in the conduit 193 to generate the generated vapor, thereby improving operational performance of the e-vaping device 100 and improving the sensory experience provided by the e-vaping device 100 and efficiency of said e-vaping device with regard to utilization of pre-vapor formulation to generate a generated vapor. Such a dispensing interface assembly 150 may also mitigate or prevent leakage of un-vaporized pre-vapor formulation from the first dispensing interface 150-1 into the conduit assembly 133, and thus potentially to an exterior of the vapor generator assembly 110 and exterior of the e-vaping device 100 through inlet port(s) 132, 152 and/or outlet ports 142, 144, thereby improving e-vaping device operational performance and efficiency with regard to utilization of pre-vapor formulation to generate a generated vapor. Such a dispensing interface assembly 150 may also mitigate or prevent storage of excessive amounts of pre-vapor formulation within the interior space 135 of the vaporizer assembly 130, thereby mitigating loss of pre-vapor formulation from the e-vaping device 100 in example embodiments where the vaporizer assembly 130 may be detachably coupled to the vapor generator assembly 110 via coupling of connector assemblies 138, 148 and thus may be decoupled and swapped for a replacement vaporizer assembly 130. Accordingly, loss of pre-vapor formulation from the e-vaping device 100 as a result of such a vapor assembly 130 swap may be mitigated by the dispensing interface assembly 150 being configured to restrict the amount of pre-vapor formulation held in the vaporizer assembly 130 to be less than a particular amount, thereby improving operational performance and efficiency of the e-vaping device 100. Accordingly, the dispensing interface assembly 150 may be configured to supply a limited amount of the pre-vapor formulation from the reservoir 112 to the heating element 136.

In some example embodiments, the e-vaping device 100 may be a unitary piece that includes the vapor generator assembly 110 and the power supply assembly 120 in the unitary piece, instead of including the vapor generator assembly 110 and the power supply assembly 120 as separate pieces that are coupled together to form the e-vaping device 100.

Still referring to FIGS. 1A-1B, the power supply assembly 120 may include a power supply 122. The power supply 122 may be a rechargeable battery, and the power supply assembly 120 may be configured to supply electrical power from the power supply 122 to the heating element 136 via one or more electrical leads included in at least the vapor generator assembly 110 to support vapor generation at the vaporizer assembly 130.

As shown in FIGS. 1A-1B, the e-vaping device 100 may include an instance of control circuitry 124 that may be configured to control the supply of electrical power from the power supply 122 to the vaporizer assembly 130. In the example embodiments shown in FIGS. 1A-1B, the control circuitry 124 is included in the power supply assembly 120, but it will be understood that, in some example embodiments, the control circuitry 124 may be included in the vapor generator assembly 110 instead of the power supply assembly 120.

In some example embodiments, wherein the vapor generator assembly 110 and the power supply assembly 120 are configured to be detachably coupled via complementary connector assemblies 118 and 128, respectively, one or more electrical circuits through the vapor generator assembly 110 and the power supply assembly 120 may be established based on connector assemblies 118, 128 being coupled together. The established electrical circuits may include at least the heating element 136, the control circuitry 124, and the power supply 122. The electrical circuit may include one or more electrical leads in one or both of connector assemblies 118, 128.

In some example embodiments, the power supply 122 may include a battery. In some example embodiments, the power supply 122 may be a Lithium-ion battery or one of its variants, for example a Lithium-ion polymer battery, a nickel-metal hydride battery, a nickel cadmium battery, a lithium-manganese battery, a lithium-cobalt battery, a fuel cell, etc., a sub-combination thereof, or a combination thereof. The e-vaping device 100 may be usable by an adult vaper until the energy in the power supply 122 is depleted or a minimum voltage cut-off level is achieved. Further, the power supply 122 may be rechargeable and may include circuitry configured to allow the battery to be chargeable by an external charging device. To recharge the e-vaping device 100, a Universal Serial Bus (USB) charger or other suitable charger assembly may be used.

In some example embodiments, the power supply 122 may be electrically connected with the heating element 136 by control circuitry 124 based on a signal received at the control circuitry 124 from a sensor of the e-vaping device 100, an interface of the e-vaping device 100, or a combination thereof. To control the supply of electrical power to a heating element 136, the control circuitry 124 may execute one or more instances of computer-executable program code. The control circuitry 124 may include a processor and a memory. The memory may be a computer-readable storage medium storing computer-executable code. The control circuitry 124 may be a special purpose machine configured to execute the computer-executable code to control the supply of electrical power to the heating element 136.

In some example embodiments, connector assemblies 118, 128 are omitted from the e-vaping device 100, such that the vapor generator assembly 110 and the power supply assembly 120 are fixedly coupled together and are precluded from being detachably coupled with each other.

In some example embodiments, connector assemblies 138, 148 are omitted from the vapor generator assembly 110, such that at least the reservoir 112 and the vaporizer assembly 130 are fixedly coupled together and are precluded from being detachably coupled with each other.

The pre-vapor formulation is a material or combination of materials that may be transformed into a vapor. In some example embodiments, the pre-vapor formulation is propylene glycol, glycerin, a sub-combination thereof, or a combination thereof. The pre-vapor formulation may include nicotine or may exclude nicotine. The pre-vapor formulation may include one or more tobacco flavors. The pre-vapor formulation may include one or more flavors that are separate from one or more tobacco flavors. In some example embodiments, a pre-vapor formulation that includes nicotine may also include one or more acids. The one or more acids may be one or more of pyruvic acid, formic acid, oxalic acid, glycolic acid, acetic acid, isovaleric acid, valeric acid, propionic acid, octanoic acid, lactic acid, levulinic acid, sorbic acid, malic acid, tartaric acid, succinic acid, citric acid, benzoic acid, oleic acid, aconitic acid, butyric acid, cinnamic acid, decanoic acid, 3,7-dimethyl-6-octenoic acid, 1-glutamic acid, heptanoic acid, hexanoic acid, 3-hexenoic acid, trans-2-hexenoic acid, isobutyric acid, lauric acid, 2-methylbutyric acid, 2-methylvaleric acid, myristic acid, nonanoic acid, palmitic acid, 4-penenoic acid, phenylacetic acid, 3-phenylpropionic acid, hydrochloric acid, phosphoric acid, sulfuric acid and combinations thereof.

The reservoir 112, in some example embodiments, may include a storage medium that may hold a pre-vapor formulation. The storage medium may be a fibrous material including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The storage medium may be a sintered, porous or foamed material. Also, the fibers may be sized to be irrespirable and may have a cross-section that has a Y-shape, cross shape, clover shape or any other suitable shape. In some example embodiments, the reservoir 112 may include a filled tank lacking any storage medium and containing only pre-vapor formulation.

The reservoir 112 may be sized and configured to hold enough pre-vapor formulation such that the e-vaping device 100 may be configured for vaping for at least about 200 seconds. The e-vaping device 100 may be configured to allow each vaping to last a maximum of about 5 seconds.

Each dispensing interface 150-1, 150-2 of the dispensing interface assembly 150 may include a wick, also referred to herein as an instance of wicking material. Each dispensing interface 150-1, 150-2 of the dispensing interface assembly 150 may include any suitable wicking material or combination of wicking materials. Examples of suitable wicking materials may be, but not limited to, glass, ceramic- or graphite-based materials. For example, the wicking material of the first dispensing interface 150-1 and/or the second dispensing interface 150-2 may include a bundle of glass (or ceramic) filaments, a bundle including a group of windings of glass filaments, etc., a sub-combination thereof, or a combination thereof. In some example embodiments, the wicking material of the first dispensing interface 150-1 and/or the second dispensing interface 150-2 may be capable of drawing pre-vapor formulation via capillary action by interstitial spacings between filaments thereof. The filaments may be generally aligned in a direction perpendicular to the longitudinal axis of the e-vaping device 100. The filaments may have a cross-section that is generally cross-shaped, clover-shaped, Y-shaped, or in any other suitable shape. Each instance of wicking material of each dispensing interface 150-1, 150-2 of the dispensing interface assembly 150 may have any suitable capillary drawing action to accommodate pre-vapor formulations having different physical properties such as density, viscosity, surface tension and vapor pressure.

The first and second dispensing interfaces 150-1, 150-2 may include separate instances of wicking material. In some example embodiments, the first and second dispensing interfaces 150-1, 150-2 may include separate instances of different wicking materials, including different cotton-based wicking materials. For example, the first dispensing interface 150-1 may include an instance of COTTON BACON® material (the mark COTTON BACON® owned by Yiwu Taohui E-Commerce Co., Ltd.), and the second dispensing interface 150-2 may include an instance of MUJI® cotton pad material (the mark MUJI® owned by Ryohin Keikaku Co., Ltd.), although it will be understood that example embodiments are not limited to this example. In some example embodiments, the first and second dispensing interfaces 150-1, 150-2 may include separate instances of a common wicking material, including a common cotton-based wicking material. For example, the first dispensing interface 150-1 and the second dispensing interface 150-2 may each include a separate instance of COTTON BACON® material (the mark COTTON BACON® owned by Yiwu Taohui E-Commerce Co., Ltd.). In another example, the first dispensing interface 150-1 and the second dispensing interface 150-2 may each include a separate instance of MUJI® cotton pad material (the mark MUJI® owned by Ryohin Keikaku Co., Ltd.).

In some example embodiments, the separate instance of wicking material of each dispensing interface 150-1, 150-2 of the dispensing interface assembly 150 may have a particular capacity to draw the pre-vapor formulation. In some example embodiments, the first and second dispensing interfaces 150-1, 150-2 may include separate instances of wicking material that each have the same capacity to draw pre-vapor formulation. In some example embodiments, the first and second dispensing interfaces 150-1, 150-2 may include separate instances of wicking material that have different capacities to draw pre-vapor formulation. For example, a first dispensing interface 150-1 and the second dispensing interface 150-2 may include separate instances of different wicking materials, where the wicking material of the second dispensing interface 150-2 has a reduced capacity to draw pre-vapor formulation than the wicking material of the first dispensing interface 150-1.

In some example embodiments, the heating element 136 may include a wire coil, although example embodiments are not limited thereto. The wire coil may at least partially surround the portion of the first dispensing interface 150-1 that is within the conduit 193 defined by the conduit assembly 133. The wire may be a metal wire and/or the wire coil may extend fully or partially along the length of the portion of the first dispensing interface 150-1. The wire coil may further extend fully or partially around the circumference of the portion of the first dispensing interface 150-1. In some example embodiments, the wire coil may be isolated from direct contact with the first dispensing interface 150-1 but may be understood to be in fluid communication with the first dispensing interface 150-1, based on the heating element 136 being in sufficiently close proximity to the first dispensing interface 150-1 to be configured to generate heat to heat the pre-vapor formulation held in the first dispensing interface 150-1 to form the generated vapor.

The heating element 136 may be formed of any suitable electrically resistive materials. Examples of suitable electrically resistive materials may include, but not limited to, titanium, zirconium, tantalum and metals from the platinum group. Examples of suitable metal alloys include, but not limited to, stainless steel, nickel, cobalt, chromium, aluminum-titanium-zirconium, hafnium, niobium, molybdenum, tantalum, tungsten, tin, gallium, manganese and iron-containing alloys, and super-alloys based on nickel, iron, cobalt, stainless steel. For example, the heating element 136 may be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heating element 136 may include at least one material selected from the group consisting of stainless steel, copper, copper alloys, nickel-chromium alloys, super alloys and combinations thereof. In some example embodiments, the heating element 136 may be formed of nickel-chromium alloys or iron-chromium alloys. In some example embodiments, the heating element 136 may be a ceramic heating element having an electrically resistive layer on an outside surface thereof.

The heating element 136 may heat a pre-vapor formulation in the first dispensing interface 150-1 by thermal conduction. Heat from the heating element 136 may be conducted to the pre-vapor formulation by means of a heat conductive element or the heating element 136 may transfer heat to the incoming ambient air that is drawn through the e-vaping device 100 during vaping, which in turn heats the pre-vapor formulation by convection.

In some example embodiments, one or more portions of the vapor generator assembly 110 may be replaceable. Such one or more portions may include the vaporizer assembly 130, the reservoir 112, a sub-combination thereof, or a combination thereof. In some example embodiments, the entire e-vaping device 100 may be disposed once the reservoir 112, the vaporizer assembly 130, or a combination thereof is depleted.

Figure 2A:
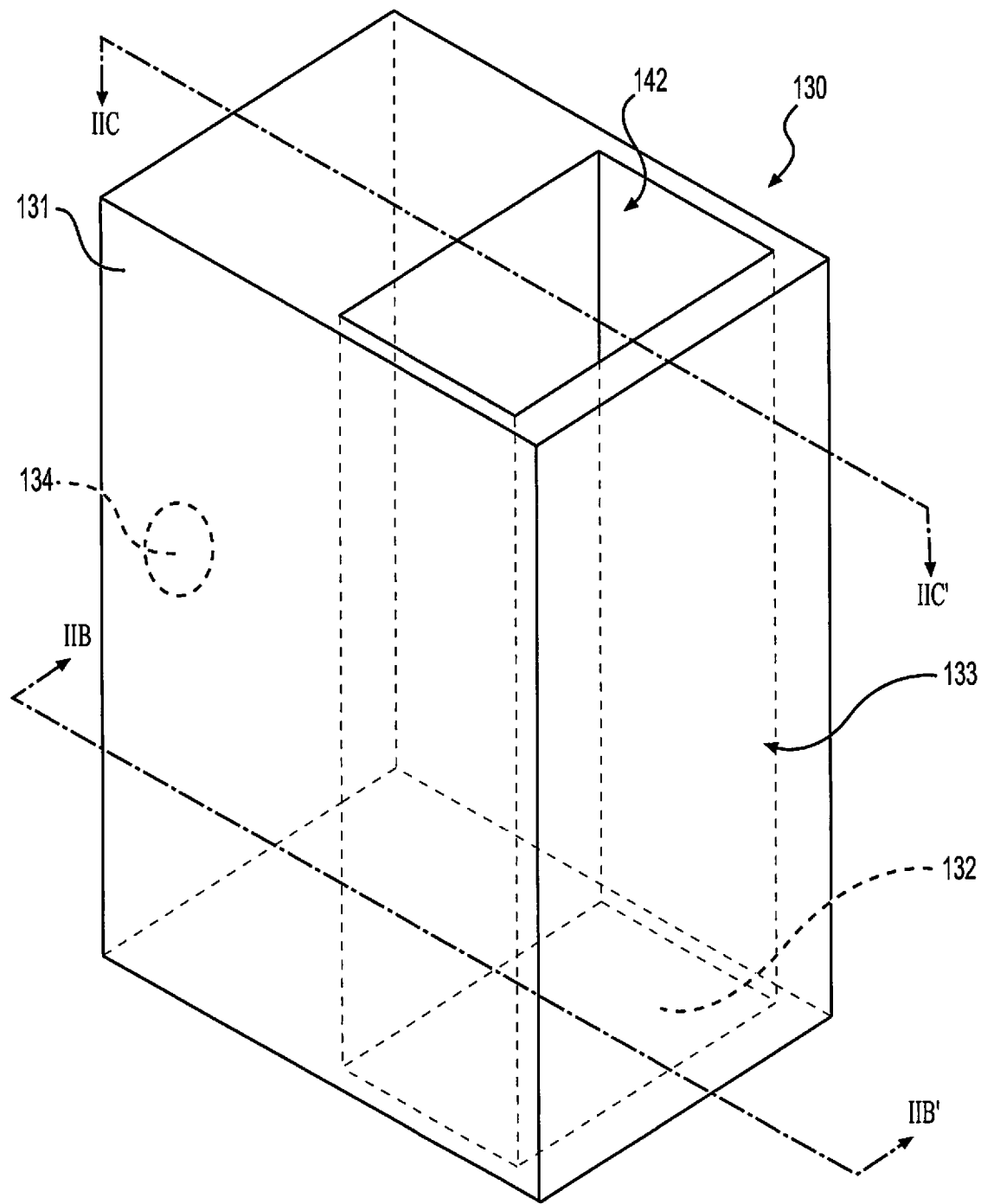
FIG. 2A is a perspective view of a vaporizer assembly according to some example embodiments.
Figure 2B:
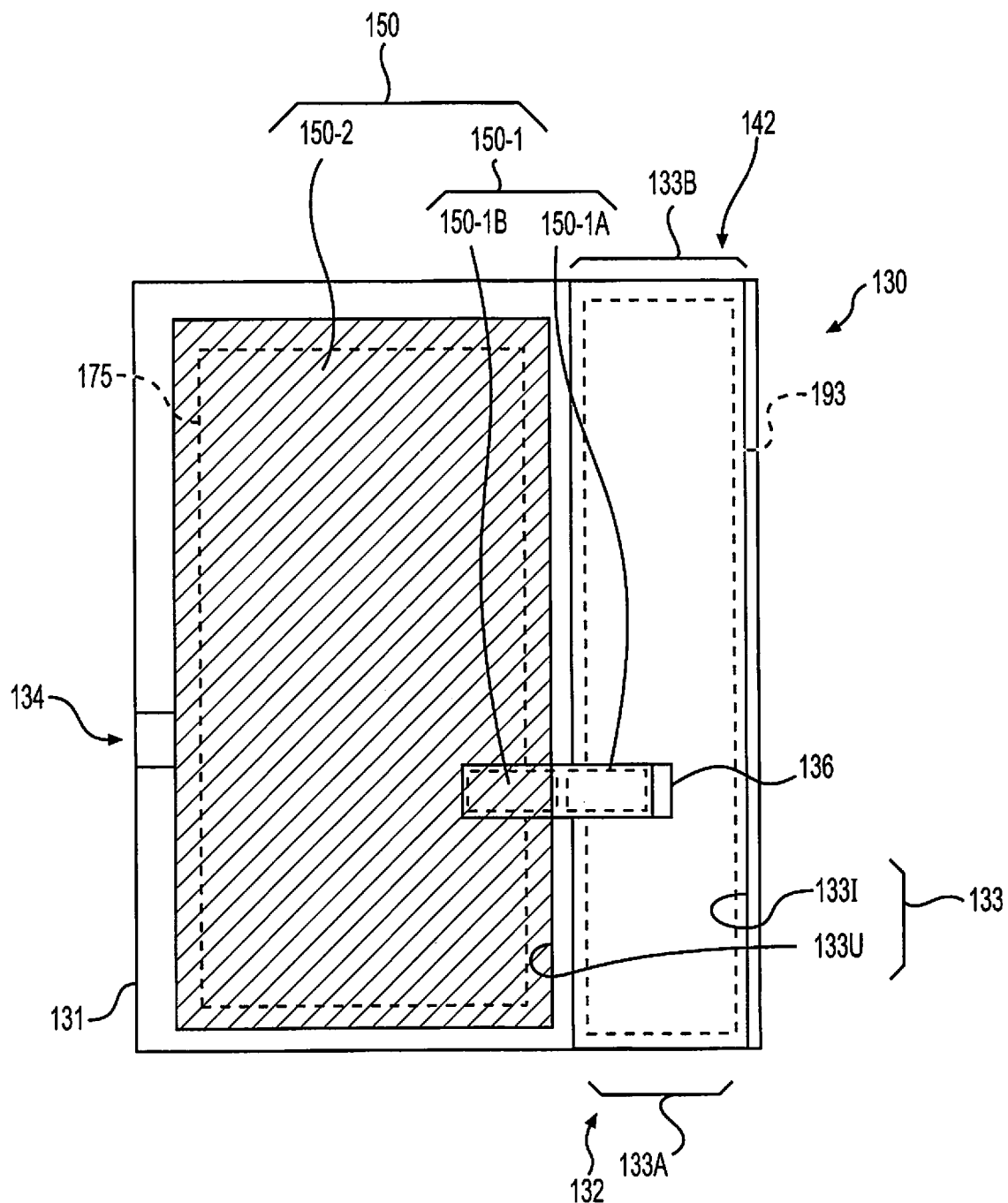
FIG. 2B is a cross-sectional view along line IIB-IIB' of the vaporizer assembly of FIG. 2A according to some example embodiments.
Figure 2C:
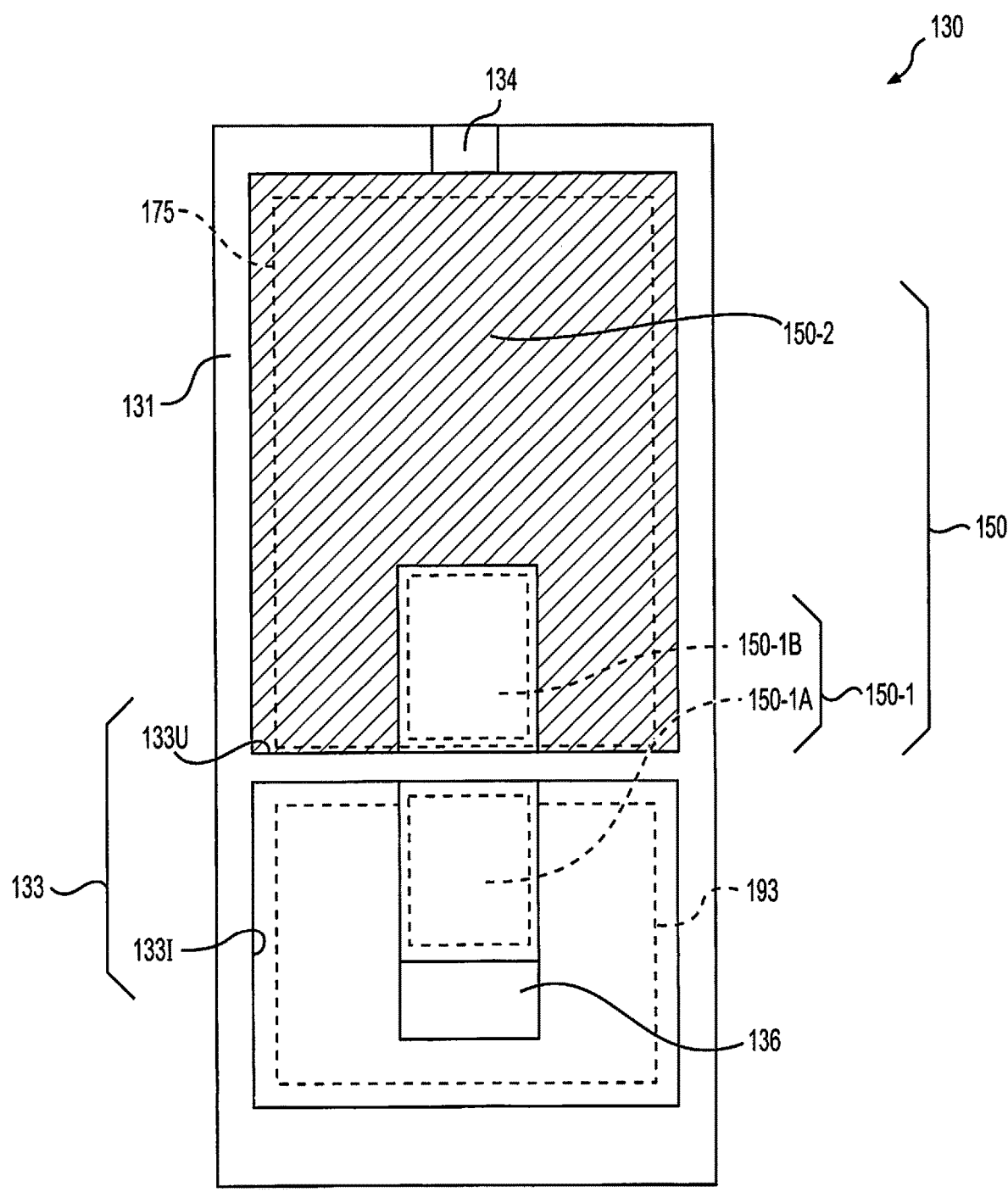
FIG. 2C is a cross-sectional view along line IIC-IIC' of the vaporizer assembly of FIG. 2A according to some example embodiments.

FIG. 2A is a perspective view of a vaporizer assembly 130 according to some example embodiments. FIG. 2B is a cross-sectional view along line IIB-IIB' of the vaporizer assembly 130 of FIG. 2A according to some example embodiments. FIG. 2C is a cross-sectional view along line IIC-IIC' of the vaporizer assembly 130 of FIG. 2A according to some example embodiments.

As shown in FIGS. 2A-2C, the vaporizer assembly 130 may include a structure that includes the outer housing 131 and conduit assembly 133 collectively defining an internal space 175 that is external to the conduit assembly 133 and is internal to the vaporizer assembly 130. As shown, the conduit assembly 133 may include a structure having inner surfaces 133I and outer surfaces 133U, where the inner surfaces 133I of the conduit assembly 133 define the conduit 193 that extends continuously between opposite openings 133A and 133B, where opening 133A defines the inlet port 132 and opening 133B defines the outlet port 142 at opposite ends of the conduit 193. As further shown, the first dispensing interface 150-1 may include first and second portions 150-1A, 150-1B, where the first portion 150-1A is the portion of the first dispensing interface 150-1 that extends into the conduit assembly 133 and at least partially into the conduit 193 defined by the inner surfaces 133I of the conduit assembly 133 and where the second portion 150-1B is the portion of the first dispensing interface 150-1 that extends into the internal space 175 and is external to the conduit assembly 133. As shown, the first and second portions 150-1A, 150-1B are integral portions of a unitary piece of material comprising the first dispensing interface 150-1, such that the first and second portions 150-1A, 150-1B are in direct fluid communication with each other and enable unrestricted flow of pre-vapor formulation between the first and second portions 150-1A, 150-1B and thus between internal space 175 and the conduit 193 through the first dispensing interface 150-1.

Still referring to FIGS. 2A-2C, the outer housing 131 and outer surface 133U of the conduit assembly 133 may collectively define an internal space 175 that is isolated from the conduit 193 and is in fluid communication with an exterior of the vaporizer assembly 130 via the fluid port 134 which extends directly between the internal space 175 and the exterior of the vaporizer assembly 130 through the outer housing 131. As shown, the second dispensing interface 150-2 and the second portion 150-1B of the first dispensing interface 150-1 may occupy the internal space 175, such that the second dispensing interface 150-2 is directly adjacent to and exposed to the fluid port 134 and further is directly adjacent to and coupled to the second portion 150-1B of the first dispensing interface 150-1, and further such that the second dispensing interface 150-2 enables fluid communication between the exterior of the vaporizer assembly 130 via fluid port 134 and the conduit 193 via second dispensing interface 150-2 and at least the second portion 150-1B of the first dispensing interface 150-1. Accordingly, the second dispensing interface 150-2 may be in indirect fluid communication with the conduit 193 and with the heating element 136 via the first and second portions 150-1A, 150-1B of the first dispensing interface 150-1. Additionally, the structure of the conduit assembly 133 that isolates the internal space 175 from the conduit 193 and at least the second portion 150-1B of the first dispensing interface 150-1 further isolates the second dispensing interface 150-2 from the conduit 193 and thus isolates the second dispensing interface 150-2 from at least direct fluid communication with the heating element 136.

As shown in FIGS. 2A-2C, the conduit assembly 133 may define a non-circular conduit 193, including a rectangular cylindrical conduit 193 as shown, but it will be understood that the conduit assembly 133 may define a conduit 193 having any shape, including a circular cylindrical conduit, a non-linear (e.g., at least partially curved) conduit, a combination or sub-combination thereof, or the like.

Figures 3A, 3B:
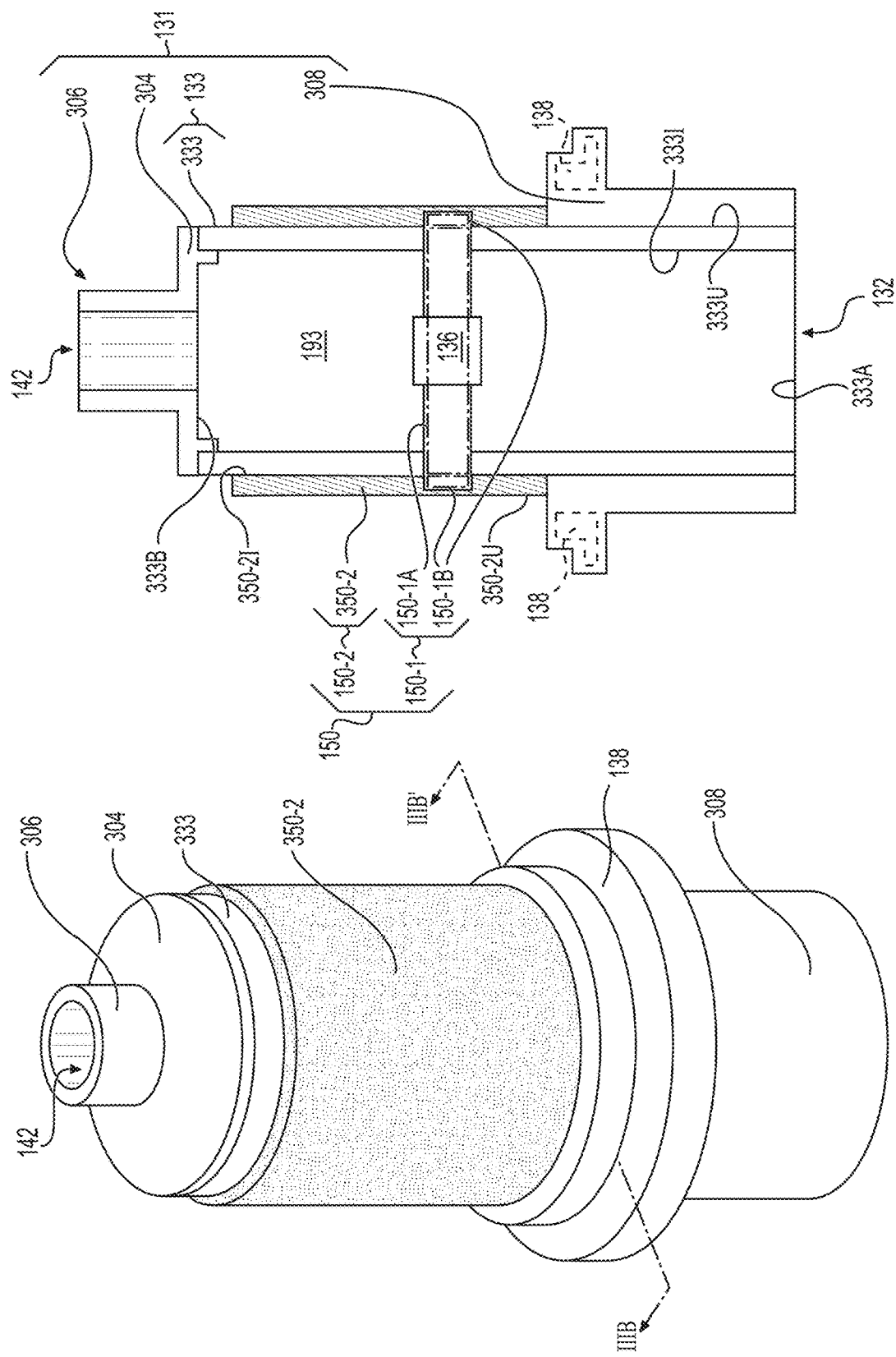
FIG. 3A is a perspective view of a vaporizer assembly according to some example embodiments.
FIG. 3B is a cross-sectional view along line IIIB-IIIB' of the vaporizer assembly of FIG. 3A according to some example embodiments.

FIG. 3A is a perspective view of a vaporizer assembly according to some example embodiments. FIG. 3B is a cross-sectional view along line IIIB-IIIB' of the vaporizer assembly of FIG. 3A according to some example embodiments.

In some example embodiments, including the example embodiments shown in FIGS. 3A-3B, the conduit assembly 133 includes a hollow cylindrical inner housing 333, and the first dispensing interface 150-1 extends transversely between opposing inner surfaces 333I of the hollow cylindrical inner housing 333 of the conduit assembly 133. In some example embodiments, including the example embodiments shown in FIGS. 3A-3B, the second dispensing interface 150-2 includes a hollow cylindrical dispensing interface structure 350-2 that extends around an outer surface 333U of the hollow cylindrical inner housing 333, such that an inner surface 350-2I of the hollow cylindrical dispensing interface structure 350-2 is in direct contact with a surface of the first dispensing interface 150-1, and an outer surface 350-2U of the hollow cylindrical dispensing interface structure 350-2 is exposed to the exterior of the vaporizer assembly 130. For example, an inner surface 350-2I of the hollow cylindrical dispensing interface structure 350-2 may be in direct contact with a surface of the second portion 150-1B of the first dispensing interface 150-1 as shown in FIG. 3B. As shown in FIGS. 3A-3B, some or all of the one or more outer surfaces 350-2U of the hollow cylindrical dispensing interface structure 350-2 may be directly exposed to the exterior of the vaporizer assembly 130, without being exposed via a space, port, conduit, or the like extending through one or more additional structural elements of the vaporizer assembly 130. Accordingly, pre-vapor formulation may be drawn directly into the second dispensing interface 150-2 through any exposed portion of an outer surface 350-2U of the hollow cylindrical dispensing interface structure 350-2.

As shown in FIG. 3B, the first dispensing interface 150-1 may be in direct contact with the heating element 136, but example embodiments are not limited thereto. As further shown in FIG. 3B, the second dispensing interface 150-2 is in direct contact with the first dispensing interface 150-1, but example embodiments are not limited thereto. As further shown in FIG. 3B, the second dispensing interface 150-2 is isolated from direct fluid communication with the conduit 193 by at least the conduit assembly 133 and the first dispensing interface 150-1, but example embodiments are not limited thereto. As further shown in FIGS. 3A-3B, the vaporizer assembly 130 may include a connector assembly 138 that is configured to be detachably coupled with a connector assembly associated with a reservoir, such that the vaporizer assembly 130 is configured to be detachably coupled to the reservoir, but example embodiments are not limited thereto.

Still referring to FIGS. 3A-3B, the outer housing 131 may include a base structure 308 and cap structure 304. As shown, the base structure 308 may surround a lower portion of the hollow cylindrical inner housing 333 of the conduit assembly 133, such that a first opening 333A of the hollow cylindrical inner housing 333 defines the inlet port 132 of the vaporizer assembly 130. As further shown, the cap structure 304 may cover at least a portion of the second opening 333B of the hollow cylindrical inner housing 333, such that a portion of the cap structure 304 defines the outlet port 142 of the vaporizer assembly 130. As shown, the cap structure 304 may include a gasket structure 306 that defines the outlet port 142.

Figure 4A:
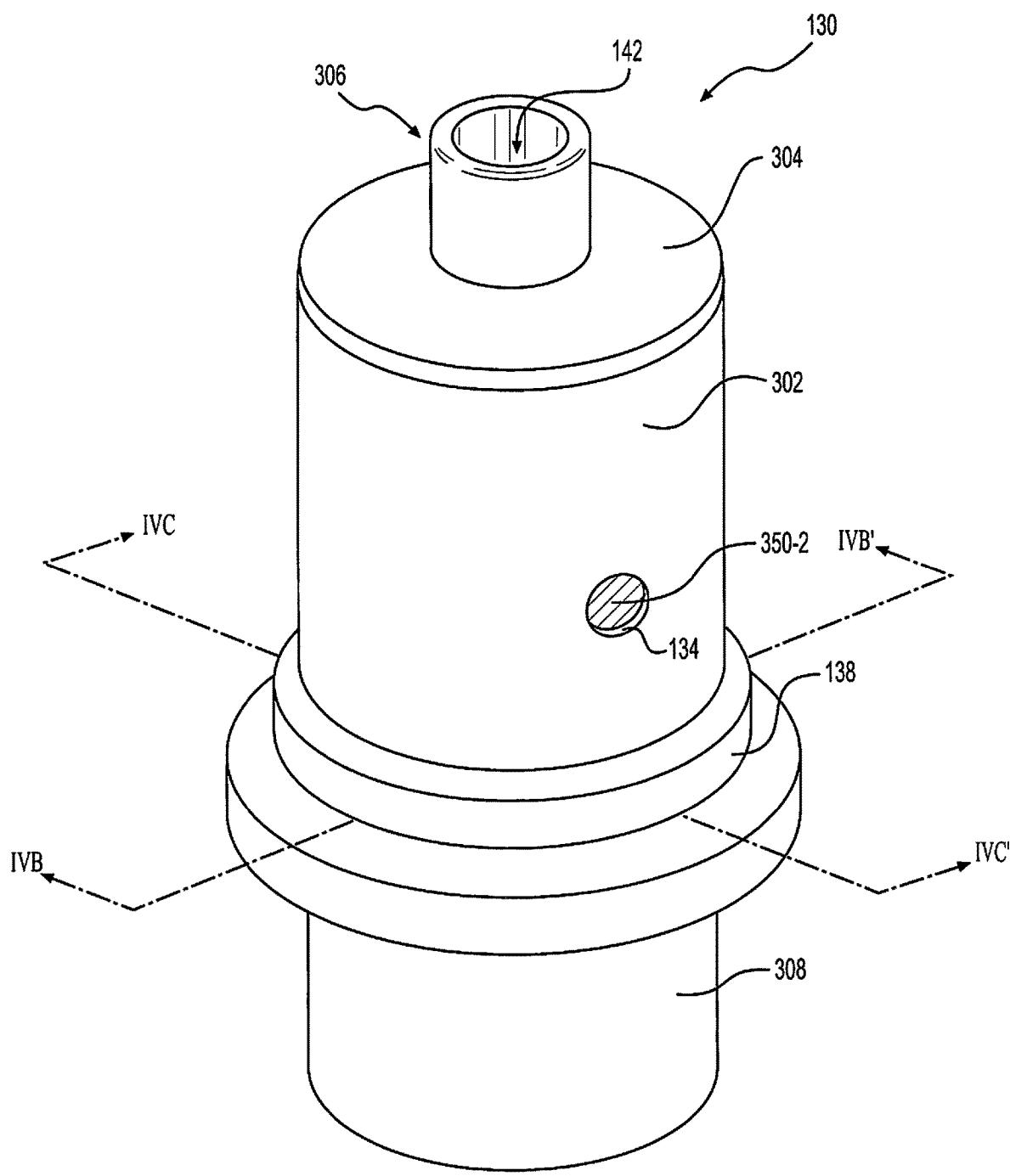
FIG. 4A is a perspective view of a vaporizer assembly according to some example embodiments.
Figure 4B:
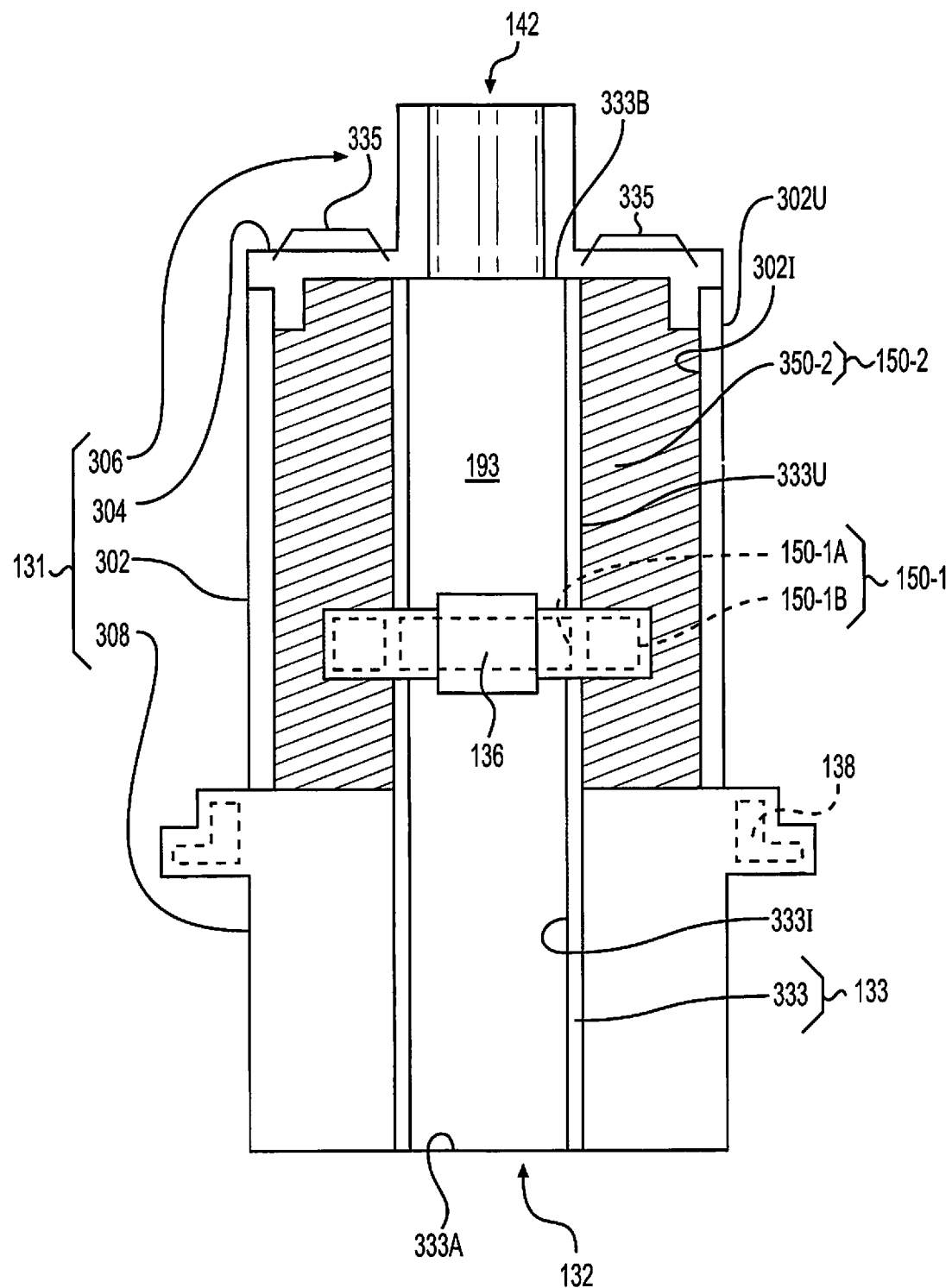
FIG. 4B is a cross-sectional view along line IVB-IVB' of the vaporizer assembly of FIG. 4A according to some example embodiments.
Figure 4C:
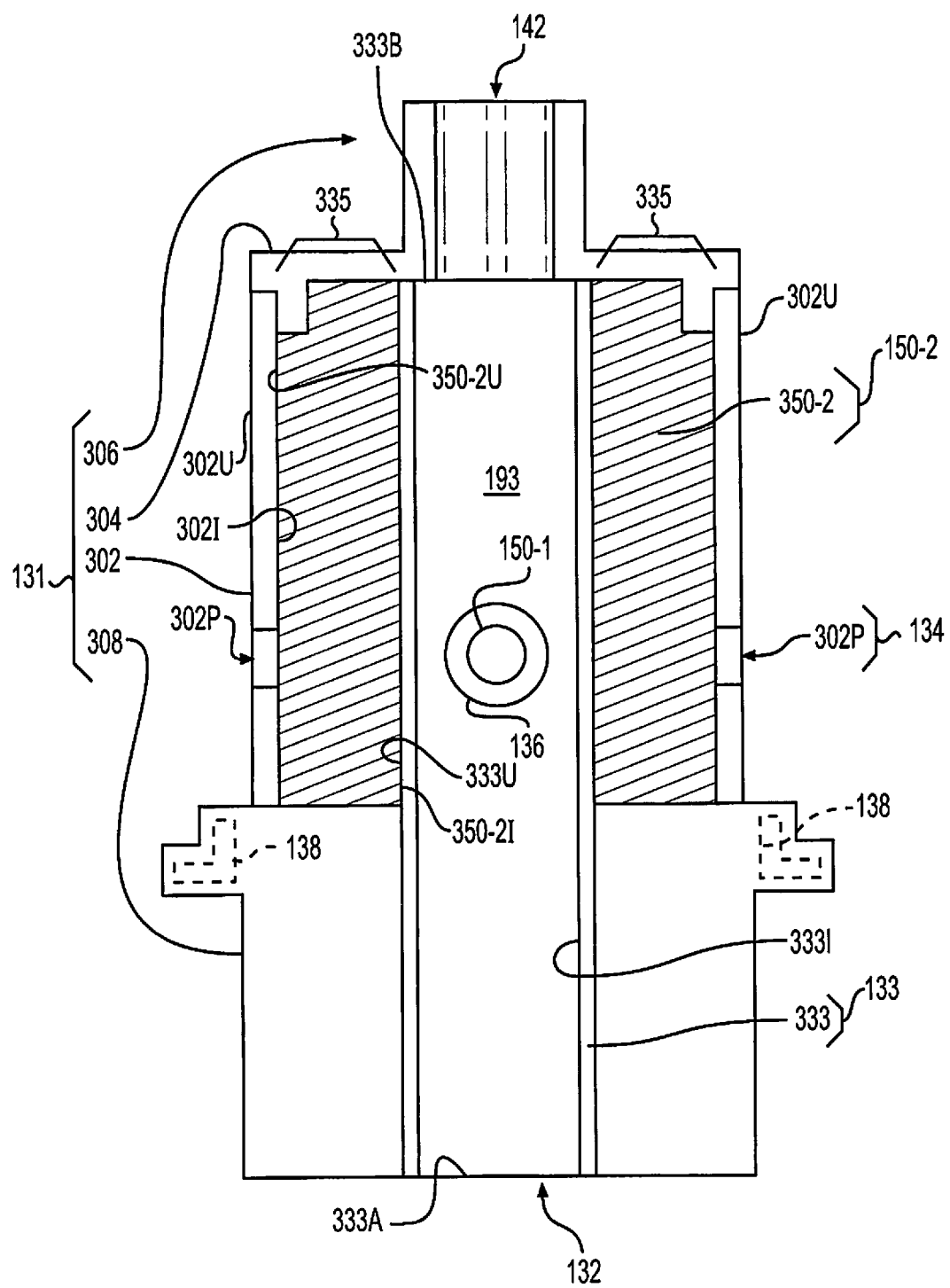
FIG. 4C is a cross-sectional view along line IVC-IVC' of the vaporizer assembly of FIG. 4A according to some example embodiments.

FIG. 4A is a perspective view of a vaporizer assembly according to some example embodiments. FIG. 4B is a cross-sectional view along line IVB-IVB' of the vaporizer assembly of FIG. 4A according to some example embodiments. FIG. 4C is a cross-sectional view along line IVC-IVC' of the vaporizer assembly of FIG. 4A according to some example embodiments.

As shown in FIGS. 4A-4C, and as distinguished from the example embodiments shown in FIGS. 3A-3B, the outer housing 131 may include a cylindrical outer housing 302 that at least partially covers the one or more outer surfaces 350-2U of the hollow cylindrical dispensing interface structure 350-2 of the second dispensing interface 150-2. As shown, the cylindrical outer housing 302 may include one or more ports 302P extending through the cylindrical outer housing 302 to an outer surface 302U that is directly exposed to the exterior of the vaporizer assembly 130, where the port 302P at least partially comprises the fluid port 134. In the example embodiments shown in FIGS. 4A-4C, the outer housing 131 includes two ports 302P extending through opposite sides of the cylindrical outer housing to opposite sides of the outer surface 302U. It will be understood that, in some example embodiments, the outer housing 131 may include a single port 302P. It will be understood that, in some example embodiments, the outer housing 131 may include more than two ports 302P.

As shown in FIGS. 4A-4C, the hollow cylindrical inner housing 333, the first dispensing interface 150-1, and the second dispensing interface 150-2 may be enclosed within an interior space at least partially defined by an inner surface 302I of the cylindrical outer housing 302. As shown in FIGS. 4A-4C, the hollow cylindrical dispensing interface structure 350-2 of the second dispensing interface 150-2 may be in an annular space 335 that is at least partially defined by the outer surface 333U of the hollow cylindrical inner housing 333 and an inner surface 302I of the cylindrical outer housing 302. Accordingly, as shown in FIGS. 4A-4C, the cylindrical outer housing 302 may be configured to expose the annular space 335 to an exterior of the vaporizer assembly 130 through the one or more ports 302P, such that the hollow cylindrical dispensing interface structure 350-2 within the annular space 335 is configured to be in direct fluid communication with the exterior of the vaporizer assembly 130 through the one or more ports 302P.

Still referring to FIGS. 4A-4B, the outer housing 131 may include a base structure 308 and cap structure 304 in addition to the cylindrical outer housing 302. As shown, the base structure 308 may surround a lower portion of the hollow cylindrical inner housing 333 of the conduit assembly 133, such that a first opening 333A of the hollow cylindrical inner housing 333 defines the inlet port 132 of the vaporizer assembly 130. Additionally, the base structure 308 may enclose a lower end of the annular space 335 between the cylindrical outer housing 302 and the hollow cylindrical inner housing 333 to thus at least partially define the annular space 335. As further shown, the cap structure 304 may cover at least an upper end of the annular space 335 and may further cover at least a portion of the second opening 333B of the hollow cylindrical inner housing 333, such that a portion of the cap structure 304 both at least partially defines the annular space 335 and defines the outlet port 142 of the vaporizer assembly 130. As shown, the cap structure 304 may include a gasket structure 306 that defines the outlet port 142.

Figure 5:
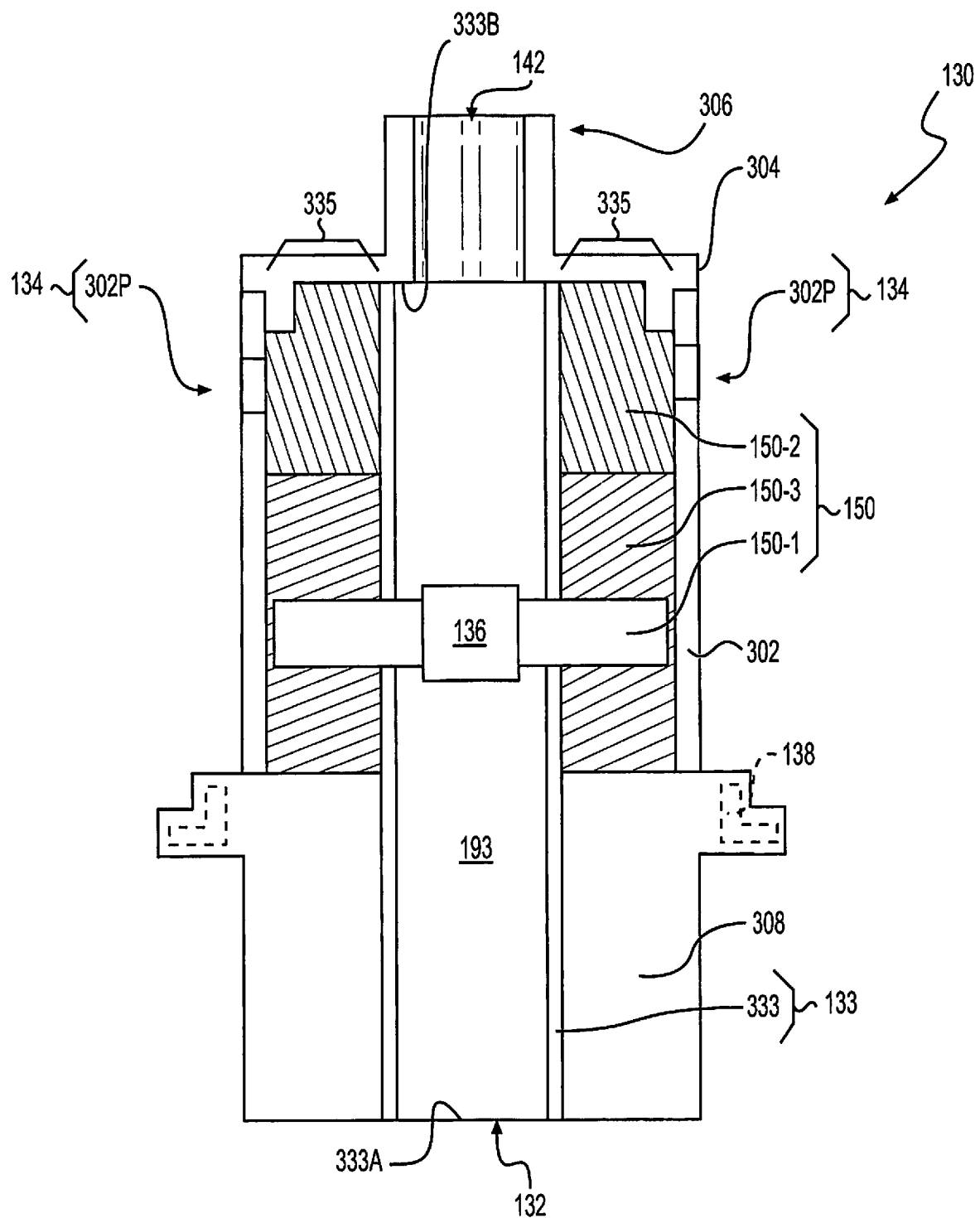
FIG. 5 is a cross-sectional view of a vaporizer assembly according to some example embodiments.

FIG. 5 is a cross-sectional view of a vaporizer assembly according to some example embodiments.

As shown in FIG. 5, in some example embodiments, a dispensing interface assembly 150 that includes a first dispensing interface 150-1 extending through the conduit assembly 133 and coupled to the heating element 136 within the conduit assembly 133 such that the first dispensing interface 150-1 is in direct fluid communication with the conduit assembly 133 and the heating element 136, and further includes a second dispensing interface 150-2 at least partially exposed to an exterior of the vaporizer assembly 130 and isolated from direct fluid communication with the heating element 136 by the first dispensing interface 150-1, may further include one or more additional dispensing interfaces 150-3 interposing between the first and second dispensing interfaces 150-1, 150-2. As a result, the one or more additional dispensing interfaces 150-3 may be directly coupled to both the first and second dispensing interfaces 150-1, 150-2. The first and second dispensing interfaces 150-1, 150-2 may be isolated from direct contact with each other by the one or more additional dispensing interfaces 150-3. The one or more additional dispensing interfaces 150-3 may enable fluid communication between the first and second dispensing interfaces 150-1, 150-2. In some example embodiments, pre-vapor formulation drawn into the second dispensing interface 150-2 via one or more ports 302P may be further drawn from the second dispensing interface 150-2 and into the first dispensing interface 150-1 via the one or more additional dispensing interfaces 150-3. The one or more additional dispensing interfaces 150-3 may include one or more instances of one or more different wicking materials than either of the first or second dispensing interfaces 150-1, 150-2 and the one or more different wicking materials may have different capacities to draw pre-vapor formulation than one or more of the wicking material(s) of the first and second dispensing interfaces 150-1, 150-2.

FIG. 6A is a perspective view of a vaporizer assembly according to some example embodiments. FIG. 6B is a perspective view of the vaporizer assembly of FIG. 6A according to some example embodiments. FIG. 6C is a cross-sectional view along line VIC-VIC' of the vaporizer assembly of FIG. 6B according to some example embodiments. FIG. 7A is a side view of an e-vaping device according to some example embodiments. FIG. 7B is a side view of the e-vaping device of FIG. 7A according to some example embodiments. FIG. 7C is a cross-sectional view along line VIIC-VIIC' of the e-vaping device of FIG. 7A according to some example embodiments.

As shown in FIGS. 6A-6C and FIGS. 7A-7C, hollow cylindrical inner housing 333 of the conduit assembly 133 may include one or more slot structures 602 into which the first dispensing interface 150-1 may be received and held in place. In the example embodiments shown in FIGS. 6A-6C, the hollow cylindrical inner housing 333 includes two slot structures 602 extending through opposite sides of the hollow cylindrical inner housing 333. It will be understood that the hollow cylindrical inner housing 333 may include one slot structure 602. It will be understood that the hollow cylindrical inner housing 333 may include more than two slot structures 602. As shown in at least FIG. 6C, the first dispensing interface 150-1 may extend through, and may be structurally supported in place by, opposing slot structures 602 at opposite sides of the hollow cylindrical inner housing 333. In some example embodiments, a width W1 of each slot structure 602 is less than a diameter of the first dispensing interface 150-1, such that a portion of the first dispensing interface 150-1 extending through a slot structure 602 is at least partially compressed by the slot structure 602 to cause the first dispensing interface 150-1 to be held in place by the slot structure 602. In some example embodiments, the first portion 150-1A of the first dispensing interface 150-1 is understood to be a portion of the first dispensing interface 150-1 that extends through conduit 193 between opposing slot structures 602 on opposite sides of the hollow cylindrical inner housing 333 of the conduit assembly 133, and the second portions 150-1B of the first dispensing interface 150-1 may be understood to be the portions of the first dispensing interface 150-1 that extend beyond the slot structures 602 and out of the hollow cylindrical inner housing 333 and into the annular space 335 that extends between the hollow cylindrical inner housing 333 and the cylindrical outer housing 302.

In some example embodiments, including the example embodiments shown in FIGS. 6A-6C, the hollow cylindrical inner housing 333 and the connector assembly 138 may form part of the same unitary piece of material. In some example embodiments, the hollow cylindrical inner housing 333 and the connector assembly 138 may be two separate elements that can be connected together. In some example embodiments, the hollow cylindrical inner housing 333, the connector assembly 138, and the base structure 308 may form part of the same unitary piece of material.

Still referring to FIGS. 6A-6C and FIGS. 7A-7C, in some example embodiments, the second dispensing interface 150-2 may be directly exposed to conduit 193 through the portions of the slot structures 602 that are not occupied by the first dispensing interface 150-1. However, as shown in FIGS. 6C and 7C, in some example embodiments, the portions of the second dispensing interface 150-2 that are directly exposed to the conduit 193 through the slot structures 602 may be sufficiently distant from the heating element 136 to be isolated from being in direct fluid communication with the heating element 136 by the interposing space of the conduit 193 and slot structures between the exposed second dispensing interface 150-2 and the heating element 136, and the second dispensing interface is further isolated from direct fluid communication with the heating element 136 by the first dispensing interface 150-1.

Still referring to FIGS. 6A-6C and FIGS. 7A-7C, in some example embodiments, the inlet port 132 is at least partially defined by a channel structure 604 that extends into the conduit 193 defined by the hollow cylindrical inner housing 333 of the conduit assembly 133 and extends through the hollow gasket 609 shown in FIG. 6C. As shown in FIG. 6C the channel structure 604 may be coupled to the hollow cylindrical inner housing 333 through the hollow gasket 609. The diameter of the inlet port 132 may be less than the diameter of the conduit 193. As shown in FIG. 6C, the channel structure 604 may be coupled to the heating element 136 via one or more electrical leads 606-1, 606-2, such that the channel structure 604 may be configured to at least partially enable an electrical coupling between the heating element 136 and a power supply 122 of the power supply assembly 120 when the vapor generator assembly 110 in which the vaporizer assembly 130 is included is coupled to the power supply assembly 120.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

We claim:

1. A vaporizer assembly for an e-vaping device, the vaporizer assembly comprising:
   a heating element;
   a conduit assembly including one or more inner surfaces defining a conduit extending through an interior of the conduit assembly, such that the conduit assembly is configured to direct air to flow through the conduit in fluid communication with the heating element; and
   a dispensing interface assembly configured to be in fluid communication with both the conduit and a reservoir holding pre-vapor formulation, the dispensing interface assembly configured to supply the pre-vapor formulation from the reservoir to the heating element, the dispensing interface assembly including a first dispensing interface and a second dispensing interface, the first dispensing interface extending through the conduit and coupled to the heating element within the conduit such that the first dispensing interface is in direct fluid communication with the conduit and the heating element, a portion of the second dispensing interface exposed to an exterior of the vaporizer assembly such that the second dispensing interface is configured to be in direct fluid communication with the reservoir via the portion of the second dispensing interface, the second dispensing interface isolated from direct fluid communication with the heating element by the first dispensing interface, the first dispensing interface isolated from direct fluid communication with the reservoir by the second dispensing interface,
   wherein the first dispensing interface and the second dispensing interface include different wicking materials having different respective capacities to draw pre-vapor formulation, such that the second dispensing interface is configured to restrict a flow of pre-vapor formulation from the reservoir to the first dispensing interface based on the first dispensing interface and the second dispensing interface including said different wicking materials
   wherein the conduit assembly includes a hollow cylindrical inner housing,
   wherein the first dispensing interface extends transversely between opposing inner curved wall surfaces of the hollow cylindrical inner housing,
   wherein the second dispensing interface includes a hollow cylindrical dispensing interface structure that extends around an outer curved wall surface of the hollow cylindrical inner housing, an inner curved wall surface of the hollow cylindrical dispensing interface structure that is proximate to the outer curved wall surface of the hollow cylindrical inner housing being in direct contact with a surface of the first dispensing interface, an outer curved wall surface of the hollow cylindrical dispensing interface structure that is distal to the outer curved wall surface of the hollow cylindrical inner housing being exposed to the exterior of the vaporizer assembly.

2. The vaporizer assembly of claim 1, further comprising:
   a cylindrical outer housing including a port extending through the cylindrical outer housing between an inner curved wall surface of the cylindrical outer housing and an outer curved wall surface of the cylindrical outer housing,
   wherein the hollow cylindrical inner housing, the first dispensing interface, and the second dispensing interface are enclosed within an interior space defined by the cylindrical outer housing,
   wherein the hollow cylindrical dispensing interface structure is in an annular space defined by the outer curved wall surface of the hollow cylindrical inner housing and the inner curved wall surface of the cylindrical outer housing,
   wherein the cylindrical outer housing is configured to expose the annular space to the reservoir through the port, such that the hollow cylindrical dispensing interface structure within the annular space is configured to be in direct fluid communication with the reservoir through the port.

3. The vaporizer assembly of claim 1, wherein the first dispensing interface is in direct contact with the heating element.

4. The vaporizer assembly of claim 1, wherein the second dispensing interface is in direct contact with the first dispensing interface.

5. The vaporizer assembly of claim 1, wherein the second dispensing interface is isolated from direct fluid communication with the conduit.

6. The vaporizer assembly of claim 1, wherein the vaporizer assembly is configured to be detachably coupled to the reservoir.

7. A cartridge for an e-vaping device, the cartridge comprising:
a reservoir configured to hold a pre-vapor formulation; and
a vaporizer assembly coupled to the reservoir, the vaporizer assembly configured to draw the pre-vapor formulation from the reservoir, the vaporizer assembly further configured to heat the drawn pre-vapor formulation to form a generated vapor, the vaporizer assembly including
a heating element;
a conduit assembly including one or more inner surfaces defining a conduit extending through an interior of the conduit assembly, such that the conduit assembly is configured to direct air to flow through the conduit in fluid communication with the heating element; and
a dispensing interface assembly configured to be in fluid communication with both the conduit and the reservoir, the dispensing interface assembly configured to supply the pre-vapor formulation from the reservoir to the heating element, the dispensing interface assembly including a first dispensing interface and a second dispensing interface, the first dispensing interface extending through the conduit and coupled to the heating element within the conduit such that the first dispensing interface is in direct fluid communication with the conduit and the heating element, a portion of the second dispensing interface exposed to an exterior of the vaporizer assembly such that the second dispensing interface is configured to be in direct fluid communication with the reservoir via the portion of the second dispensing interface, the second dispensing interface isolated from direct fluid communication with the heating element by the first dispensing interface, the first dispensing interface isolated from direct fluid communication with the reservoir by the second dispensing interface,
wherein the first dispensing interface and the second dispensing interface include different wicking materials having different respective capacities to draw pre-vapor formulation, such that the second dispensing interface is configured to restrict a flow of pre-vapor formulation from the reservoir to the first dispensing interface based on the first dispensing interface and the second dispensing interface including said different wicking materials
wherein the conduit assembly includes a hollow cylindrical inner housing,
wherein the first dispensing interface extends transversely between opposing inner curved wall surfaces of the hollow cylindrical inner housing,
wherein the second dispensing interface includes a hollow cylindrical dispensing interface structure that extends around an outer curved wall surface of the hollow cylindrical inner housing, an inner curved wall surface of the hollow cylindrical dispensing interface structure that is proximate to the outer curved wall surface of the hollow cylindrical inner housing being in direct contact with a surface of the first dispensing interface, an outer curved wall surface of the hollow cylindrical dispensing interface structure that is distal to the outer curved wall surface of the hollow cylindrical inner housing being exposed to the exterior of the vaporizer assembly.

8. The cartridge of claim 7, wherein the vaporizer assembly further includes
a cylindrical outer housing including a port extending through the cylindrical outer housing between an inner curved wall surface of the cylindrical outer housing and an outer curved wall surface of the cylindrical outer housing,
wherein the hollow cylindrical inner housing, the first dispensing interface, and the second dispensing interface are enclosed within an interior space defined by the cylindrical outer housing,
wherein the hollow cylindrical dispensing interface structure of the second dispensing interface is in an annular space defined by the outer curved wall surface of the hollow cylindrical inner housing and the inner curved wall surface of the cylindrical outer housing,
wherein the cylindrical outer housing is configured to expose the annular space to the reservoir through the port, such that the hollow cylindrical dispensing interface structure within the annular space is configured to be in direct fluid communication with the reservoir through the port.

9. The cartridge of claim 7, wherein the first dispensing interface is in direct contact with the heating element.

10. The cartridge of claim 7, wherein the second dispensing interface is in direct contact with the first dispensing interface.

11. The cartridge of claim 7, wherein the second dispensing interface is isolated from direct fluid communication with the conduit.

12. The cartridge of claim 7, wherein the vaporizer assembly is detachably coupled to the reservoir.

13. An e-vaping device, the e-vaping device comprising:
a cartridge, the cartridge including
a reservoir configured to hold a pre-vapor formulation, and
a vaporizer assembly coupled to the reservoir, the vaporizer assembly configured to draw the pre-vapor formulation from the reservoir, the vaporizer assembly further configured to heat the drawn pre-vapor formulation to form a generated vapor, the vaporizer assembly including
a heating element;
a conduit assembly including one or more inner surfaces defining a conduit extending through an interior of the conduit assembly, such that the conduit assembly is configured to direct air to flow through the conduit in fluid communication with the heating element; and
a dispensing interface assembly configured to be in fluid communication with both the conduit and the reservoir, the dispensing interface assembly configured to supply the pre-vapor formulation from the reservoir to the heating element, the dispensing interface assembly including a first dispensing interface and a second dispensing interface, the first dispensing interface extending through the conduit and coupled to the heating element within the conduit such that the first dispensing interface is in direct fluid communication with the conduit and the heating element, a portion of the second dispensing interface exposed to an exterior of the vaporizer assembly such that the second dispensing interface is configured to be in direct fluid communication with the reservoir via the portion of the second dispensing interface, the second dispensing interface isolated from direct fluid communication with the heating element by the first dispensing interface, the first dispensing interface isolated from direct fluid communication with the reservoir by the second dispensing interface, wherein the first dispending interface and the second dispensing interface include different wicking materials having different respective capacities to draw pre-vapor formulation, such that the second dispensing interface is configured to restrict a flow of pre-vapor formulation from the reservoir to the first dispensing interface based on the first dispensing interface and the second dispensing interface including said different wicking materials; and a power supply assembly coupled to the cartridge, the power supply assembly including a power supply, the power supply assembly configured to supply electrical power from the power supply to the vaporizer assembly wherein the conduit assembly includes a hollow cylindrical inner housing, wherein the first dispensing interface extends transversely between opposing inner curved wall surfaces of the hollow cylindrical inner housing, wherein the second dispensing interface includes a hollow cylindrical dispensing interface structure that extends around an outer curved wall surface of the hollow cylindrical inner housing, an inner curved wall surface of the hollow cylindrical dispensing interface structure that is proximate to the outer curved wall surface of the hollow cylindrical inner housing being in direct contact with a surface of the first dispensing interface, an outer curved wall surface of the hollow cylindrical dispensing interface structure that is distal to the outer curved wall surface of the hollow cylindrical inner housing being exposed to the exterior of the vaporizer assembly.

14. The e-vaping device of claim 13, wherein the vaporizer assembly further includes a cylindrical outer housing including a port extending through the cylindrical outer housing between an inner curved wall surface of the cylindrical outer housing and an outer curved wall surface of the cylindrical outer housing, the hollow cylindrical inner housing, the first dispensing interface, and the second dispensing interface are enclosed within an interior space defined by the cylindrical outer housing, the hollow cylindrical dispensing interface structure of the second dispensing interface is in an annular space defined by the outer curved wall surface of the hollow cylindrical inner housing and the inner curved wall surface of the cylindrical outer housing, and the cylindrical outer housing is configured to expose the annular space to the reservoir through the port, such that the hollow cylindrical dispensing interface structure within the annular space is configured to be in direct fluid communication with the reservoir through the port.

15. The e-vaping device of claim 13, wherein the first dispensing interface is in direct contact with the heating element.

16. The e-vaping device of claim 13, wherein the second dispensing interface is in direct contact with the first dispensing interface.

17. The e-vaping device of claim 13, wherein the second dispensing interface is isolated from direct fluid communication with the conduit.

18. The e-vaping device of claim 13, wherein the cartridge is detachably coupled to the power supply assembly.

19. The e-vaping device of claim 18, wherein the vaporizer assembly is detachably coupled to the reservoir.

20. The e-vaping device of claim 13, wherein the power supply is a rechargeable battery.

* * * * *